United States Patent
Meinig

(10) Patent No.: US 12,031,629 B2
(45) Date of Patent: *Jul. 9, 2024

(54) PUMP WITH A MULTI-LAYERED BEAD GASKET

(71) Applicant: Schwäbische Hüttenwerke Automotive GmbH, Aalen (DE)

(72) Inventor: Uwe Meinig, Bad Saulgau (DE)

(73) Assignee: SCHWÄBISCHE HÜTTENWERKE AUTOMOTIVE GMBH, Aalen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/546,686

(22) Filed: Dec. 9, 2021

(65) Prior Publication Data

US 2022/0186834 A1 Jun. 16, 2022

(30) Foreign Application Priority Data

Dec. 11, 2020 (DE) ..................... 10 2020 133 200.9

(51) Int. Cl.
*F16J 15/08* (2006.01)
*F01C 21/10* (2006.01)
(Continued)

(52) U.S. Cl.
CPC .......... *F16J 15/0818* (2013.01); *F01C 21/108* (2013.01); *F04C 2/3446* (2013.01);
(Continued)

(58) Field of Classification Search
CPC .... F01C 21/108; F04C 15/0034; F04C 15/06; F04C 15/0023; F04C 2/3446;
(Continued)

(56) References Cited

U.S. PATENT DOCUMENTS 4,294,252 A   10/1981  Einset
5,522,604 A    6/1996  Weiss et al.
(Continued)

FOREIGN PATENT DOCUMENTS

DE    4219709 A1    2/1994
DE   19822772 A1   12/1999
(Continued)

OTHER PUBLICATIONS

European Search Report for European Application No. 21213498.5, dated Apr. 20, 2022, 12 pages. (with English 1 translation).
(Continued)

*Primary Examiner* — Mary Davis
(74) *Attorney, Agent, or Firm* — Buchanan Ingersoll & Rooney PC

(57) ABSTRACT

A bead gasket for sealing off a gap between a first component and a second component, the bead gasket including: a first gasket layer including a holding element; a second gasket layer comprising a complementary holding element; and one or more folding portions which connect(s) the first gasket layer and the second gasket layer, wherein the first gasket layer, the second gasket layer and the respective folding portion are formed in one piece, and the gasket layers are or can be folded one onto the other by folding over the respective folding portion, such that they face each other in an axial direction, and wherein the holding element and the complementary holding element are in or can be moved into a holding engagement with each other based on a positive fit and/or frictional fit, in order to secure the gasket layers against diverging from each other.

23 Claims, 7 Drawing Sheets

(51) Int. Cl.
*F04C 2/344* (2006.01)
*F04C 15/00* (2006.01)
*F04C 15/06* (2006.01)
*F16J 15/02* (2006.01)

(52) U.S. Cl.
CPC ...... *F04C 15/0023* (2013.01); *F04C 15/0034* (2013.01); *F04C 15/06* (2013.01); *F16J 15/024* (2013.01); *F16J 15/0825* (2013.01); *F16J 15/0831* (2013.01); *F04C 2240/30* (2013.01)

(58) Field of Classification Search
CPC .. F04C 2240/30; F16J 15/024; F16J 15/0818; F16J 15/0825; F16J 15/0831
See application file for complete search history.

(56) References Cited

U.S. PATENT DOCUMENTS

| | | | | |
|---|---|---|---|---|
| 6,131,915 | A | * | 10/2000 | Nicholson ............ F16J 15/0825 277/593 |
| 2002/0170520 | A1 | | 11/2002 | Miyaoh |
| 2004/0046332 | A1 | | 3/2004 | Hegmann |
| 2016/0061444 | A1 | | 3/2016 | Haefner |
| 2016/0305428 | A1 | | 10/2016 | Welte et al. |
| 2017/0260979 | A1 | | 9/2017 | Müller et al. |
| 2021/0164460 | A1 | | 6/2021 | Baur et al. |

FOREIGN PATENT DOCUMENTS

| | | |
|---|---|---|
| DE | 60117083 T2 | 9/2006 |
| DE | 102010028899 A1 | 11/2011 |
| DE | 102014112848 A1 | 3/2016 |
| DE | 102014217414 A1 | 3/2016 |
| DE | 102019132729 A1 | 7/2021 |
| EP | 1389701 A2 | 2/2004 |
| EP | 3081741 A2 | 10/2016 |
| ES | 121955 U | 9/1966 |
| ES | 121956 U | 9/1966 |

OTHER PUBLICATIONS

German Search Report issued in German Patent Application No. 10 2020 133 200.9, dated Aug. 8, 2021, with partial English Translation, 7 pages.
European Communication for European Application No. 21213498.5, dated Sep. 20, 2023 with translation, 8 pages.

* cited by examiner

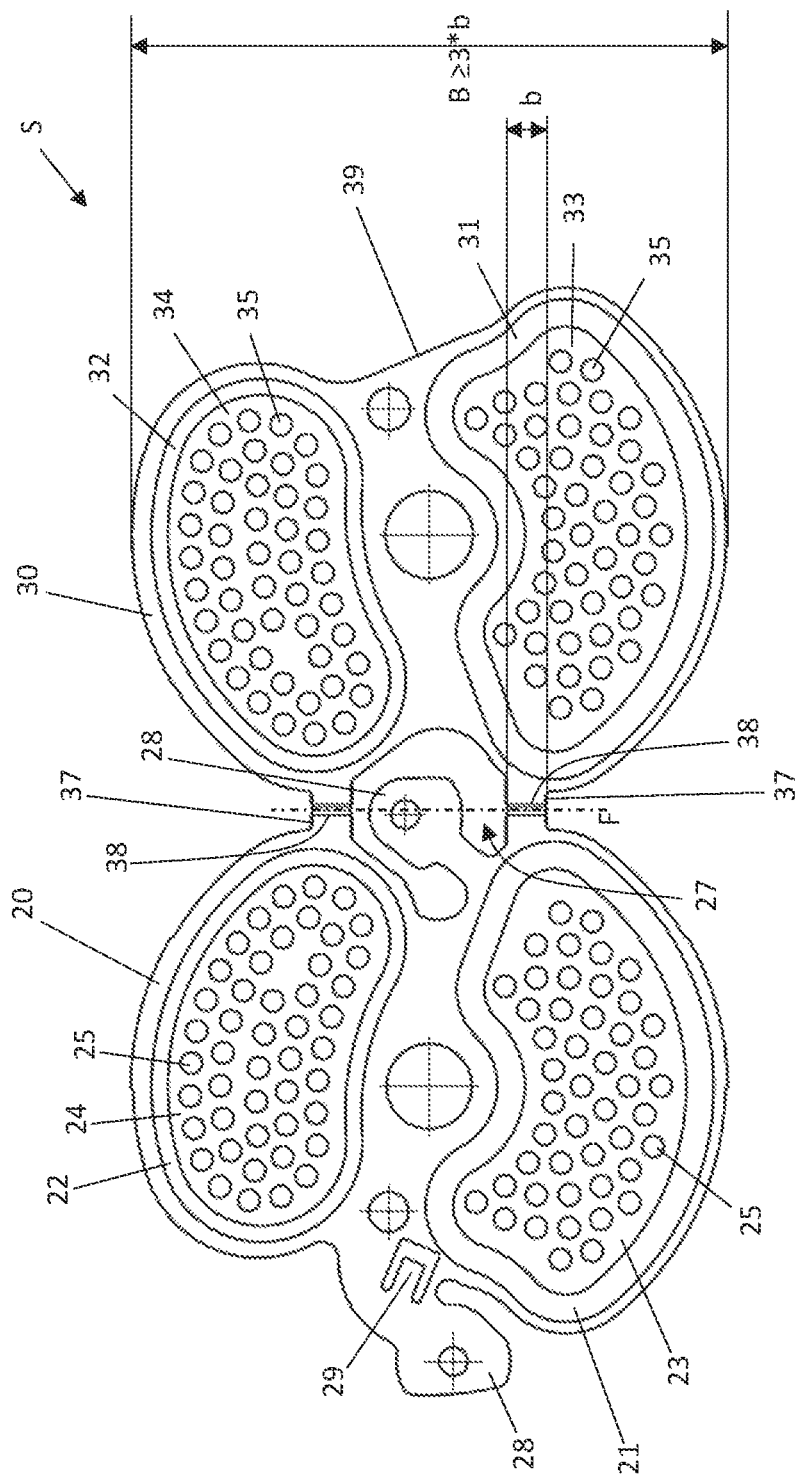

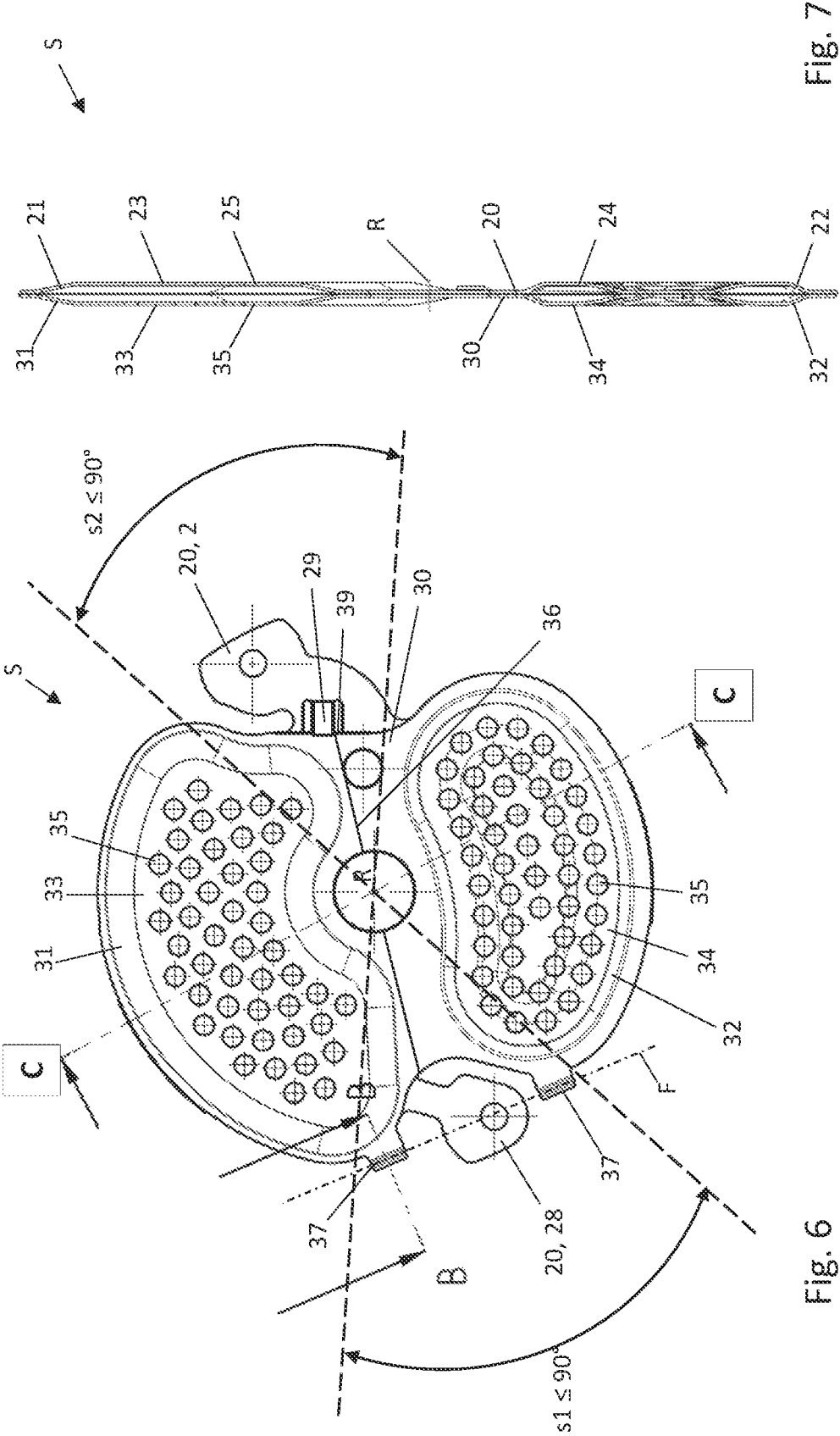

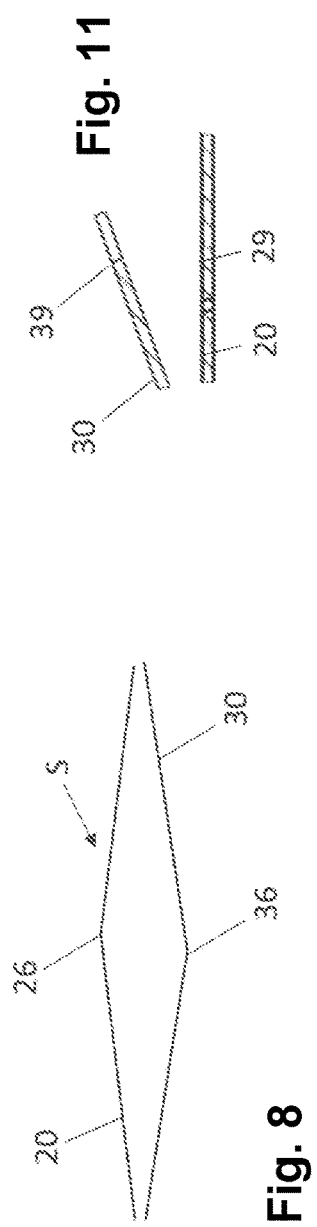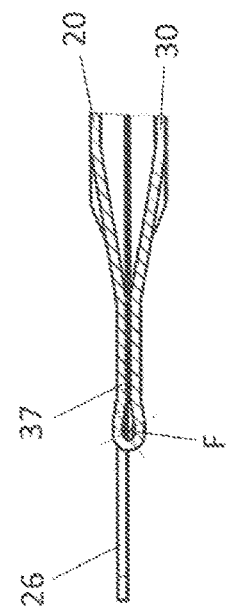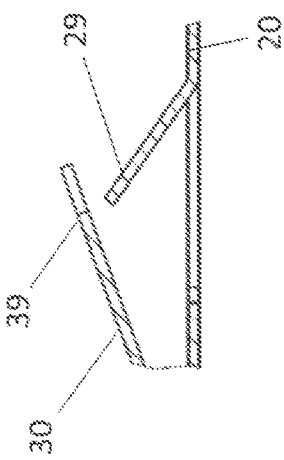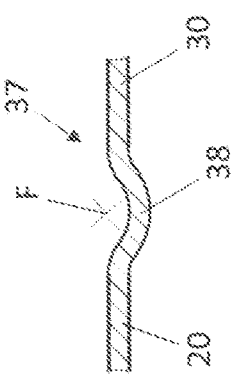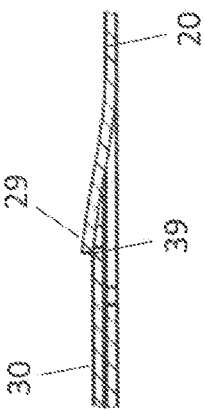

PUMP WITH A MULTI-LAYERED BEAD GASKET

CROSS REFERENCE TO RELATED APPLICATION

This application claims benefit of priority to German Patent Application No. 10 2020 133 200.9, filed Dec. 11, 2020. The contents of this application being incorporated herein by reference.

FIELD OF THE INVENTION

The invention relates to a bead gasket for sealing off a gap between a first component and a second component. The invention also relates to a pump, such as for example a lubricating oil pump, a coolant pump, a vacuum pump or in particular a gear pump, comprising a bead gasket for sealing off a fluid outlet of the pump. The pump can be a single-flux pump or a multi-flux pump, in particular a multi-circuit pump. It can advantageously be embodied as a cartridge. The pump can serve as a gear pump for supplying a gearbox, for example an automatic gearbox or steering gearbox of a vehicle or wind turbine, with pressure fluid. In another application, it can serve as a lubricant pump and/or coolant pump for supplying a combustion engine, for example a drive motor of a vehicle, with lubricant and/or coolant, in particular lubricating oil. It is equally conceivable to use it as a combined lubricating oil pump and gear pump, in particular in embodiments in which the pump is a multi-flux pump. The pump can be used to lubricate and/or cool an electric motor which for example forms a drive motor or auxiliary drive motor of a motor vehicle. The bead gasket in accordance with the invention can however also be used to seal off fluid connections, for example to seal off a gap between two sections of pipe or conduit which are connected to each other, or an inlet or outlet of a hydraulic motor.

BACKGROUND OF THE INVENTION

EP 3 081 741 A2, incorporated herein by reference, discloses a gear pump exhibiting multiple working fluxes. The pump is embodied as a multi-circuit pump and accordingly comprises separate pressure outlets which are sealed off from each other. A first pressure outlet is sealed off by means of an annular radial gasket which surrounds a housing of the pump. An outlet gasket which is arranged, in the form of an axial gasket, within the pressure space obtained by means of the radial gasket surrounds a second pressure outlet in order to separate the second pressure outlet from the first pressure space. The pump is embodied as a cartridge and introduced into an accommodating well of an accommodating device with an outer end-facing side of the pump housing first. A pressure fluid delivered by the pump is discharged via the pressure outlets and pressure ports of the accommodating device which axially oppose them. A spring device is supported on a base of the accommodating well and presses with a spring force against the outer end-facing side of the pump housing which faces axially opposite, thus enabling production/assembly tolerances and operational induced changes in geometry to be compensated for in the axial direction.

US 2017/0260979 A1, incorporated herein by reference, discloses a gasket array for a cartridge-type vane cell pump, wherein the vane cell pump exhibits two working fluxes and is embodied as a dual-circuit pump. The gasket array comprises a radial gasket, which is arranged circumferentially around the circumference of the pump housing and separates a first pressure space of the pump from the suction space, and an outlet gasket which is embodied as an axial gasket and arranged on an outer end-facing side of the pump insert. The outlet gasket separates the first pressure space from a second pressure space of the pump and seals off a shaft passage for a drive shaft of the pump.

The prior art uses soft material gaskets to seal off the respective pump outlet. If the gaskets are used as axial gaskets, it is difficult to ensure the sealing effect based on the elasticity of the material. The width of the gap sealed by means of the axial gasket can change, for example due to thermally induced changes in the geometry and/or pressure-induced movements of the pump housing or housing parts. The gap width can also vary from installation to installation due to component tolerances and/or installation tolerances. Soft material gaskets require high surface compression which is uniform over their circumference in order to achieve the necessary seal. If the surface compression changes while the pump is in operation, due to changes in temperature and/or pressure or from pump to pump due to varying tolerances, a consistently secure sealing effect can be ensured only at great effort and expense. Stability is also a problem. In the event of pulses, high pressures and large gap widths to be bridged, there is an increased risk of gap extrusion.

Metal bead gaskets have proven effective for sealing off at high temperatures and periodic changes in pressure, for example for sealing off cylinder heads. DE 42 19 709 A1, incorporated herein by reference, discloses examples of this.

Unlike typical sealing scenarios in which the bead gasket is installed in a fixed, axially tensioned assemblage, the outlet gasket for sealing off a pressure outlet of for example a cartridge pump must compensate not only for the sum of the axial tolerances of the axial assemblage of pump components and the axial tolerances of for example a pump cavity, which accumulate under unfavourable conditions, but also the thermal expansion of the different components of the assemblage which occur when the pump is in operation, wherein the sealing surfaces in typical installations are unconventionally pressed apart by a spring device, typically a pre-tensioning disc spring, supported on the base of said cavity. The outlet gasket, with its axial spring properties, must therefore compensate for significantly larger tolerances in the gap width than a gasket in a fixedly tensioned assemblage, such as for example a cylinder head gasket.

The Applicant has developed bead gaskets which meet the requirements described with regard to compensating for relatively large variations in the gap width. An advantageous bead gasket is for example disclosed in German patent application No. 10 2019 132 729.6, incorporated herein by reference, is referenced with regard to the arrangement and embodiment of the bead gasket and in particular with regard to rigidifying one or more bead loops.

In order to position two or more gasket layers of a bead gasket relative to each other, such that the bead loops of the layers are axially flush to a level of precision which is sufficient for the application, the gasket layers are fixed to each other when manufacturing the bead gasket. They can be fixed, as is for example the case with cylinder head gaskets, by rivets. A prerequisite of the rivet solution is that the structural constraints allow the rivets to be positioned outside the region of the bead loops, such that the rivet heads, which are axially raised above the bead loops, do not prematurely abut when the bead gasket is installed and tensioned. It would also be possible to connect the gasket layers by providing one gasket layer with one or more hollow rivet-shaped rabbets and another of the gasket layers with one or more bores in a punching and deep-drawing process and then joining the gasket layers by inserting the rabbets into the corresponding bores and riveting them. Such rivet solutions have the additional disadvantage that there is a risk of material breakage in the region of the rabbets due to high degrees of deformation of the spring steel which is used in most cases and which can only be plastically deformed to a limited extent. Providing one of the gasket layers with sheet metal tabs which are folded over around a circumferential edge of another gasket layer when joining the layers is also known. A disadvantage of such folded connections is that folding over the sheet metal tabs requires a relatively high degree of deformation and thus significant plastic deformation and thus incurs a risk of the respective sheet metal tab breaking off. In addition, folding over sheet metal tabs in the connection region produces an overall axial height which exceeds the gasket layers joined in this way by the thickness of one of the gasket layers. Joining the gasket layers by welding them is also known. A substantial disadvantage of welding is that because molten spatter and metal oxides are inevitably generated, the welding process makes it more difficult to meet the requirements for technical cleanliness of the bead gasket. For using the bead gasket in a high-pressure pump of an automatic gearbox, for example, which the invention is also in particular aimed at, the problem of residual soiling associated with welding processes is tantamount to a disqualifying criterion. The joining processes mentioned are associated with considerable effort and expense.

In order to avoid these problems, EP 1 389 701 A2, incorporated herein by reference, proposes providing one gasket layer of a flat gasket with holding elements, and another gasket layer of the flat gasket with complementary holding elements, which engage behind each other in a holding engagement in each case. The option of sealing off an engine block and a cylinder head using said multi-layer flat gasket is mentioned. A bead gasket is not described. Joining gasket layers of a multi-layer flat gasket using multiple holding elements and complementary holding elements, which engage behind each other in a holding engagement in each case, may also be gathered from DE 198 22 772 A1, incorporated herein by reference, which does not mention any specific application and also does not refer to any embodiment of the flat gasket as a bead gasket. The multi-layer flat gaskets of the prior art consist of separately produced gasket layers which are joined with the aid of multiple pairs of holding elements and complementary holding elements arranged in a distribution over the surface of the respective flat gasket. The gasket layers have to be separated out and positioned and held relative to each other for joining. Joining is itself also laborious and expensive, since a large number of holding elements and complementary holding elements have to be moved into holding engagement in respective pairs.

SUMMARY OF THE INVENTION

An aspect of the invention is an inexpensive gasket for an axial sealing contact, which can effectively and reliably (over the longer term) compensate for component tolerances and/or installation tolerances and/or thermally induced changes in geometry and/or pressure-induced movements of components at the point of installation of the gasket while maintaining the necessary sealing effect.

One aspect is ease of handling. A multi-layer bead gasket shall be able to be easily and securely stored in a magazine, transported, separated out for assembly and automatically assembled in a procedurally secure way in an assembly system.

Another aspect is technical cleanliness. When joining two or more gasket layers, as little soiling as possible and advantageously no soiling shall be introduced into the bead gasket.

Another aspect is a pump which is suitable for arranging in an accommodating well of an accommodating device and which for this purpose comprises a housing end-facing wall comprising one or more pressure outlets for discharging a pressure fluid from a delivery chamber of the pump. The seal on the one or more pressure outlets in such a pump shall be cost-effectively improved with regard to component tolerances and/or installation tolerances of the accommodating device and pump and/or thermally induced changes in geometry and/or pressure-induced movements of housing structures of the pump.

An aspect of the invention proposes a multi-layer bead gasket. The bead gasket comprises a first gasket layer comprising a holding element, a second gasket layer comprising a complementary holding element, and one or more folding portions which connect(s) the first gasket layer and the second gasket layer. The bead gasket can comprise one or more other gasket layers and can for example have three or four layers. In particular, however, the first gasket layer and second gasket layer alone can form the bead gasket as a dual-layer bead gasket.

The first gasket layer, the second gasket layer and the respective folding portion are formed in one piece, for example from a sheet of spring steel. The bead gasket can be provided in a folded state or in an unfolded state. In the folded or only partially folded state, the gasket layers face each other in the axial direction. In the folded state, they lie one on top of the other, which also includes the scenario in which they lie one on top of the other via an intermediate layer. Preferably, however, they lie directly one on top of the other in the folded state.

The holding element and the complementary holding element are in or can be moved into a holding engagement with each other based on a positive fit and/or frictional fit. In the holding engagement, they secure the gasket layers against diverging from each other, which can occur in the unsecured state, for example due to a deformation of the respective folding portion (which is not only a plastic deformation but also to a certain, albeit small extent an elastic deformation) and/or minor moulding defects in the typically thin gasket layers.

In advantageous first embodiments, the bead gasket manages with one holding engagement, i.e. in such embodiments, the gasket layers which are secured or are to be secured relative to each other comprise only one holding element and one complementary holding element, respectively. In second embodiments, the first gasket layer comprises another holding element, and the second gasket layer comprises another complementary holding element, which engage behind each other in another holding engagement or can be moved into said other holding engagement in order to secure the gasket layers against diverging from each other. The possibility is also not to be excluded that the first gasket layer comprises one or more other holding elements and the second gasket layer comprises one or more other complementary holding elements, which are in or can be moved into a holding engagement in respective pairs. In advantageous embodiments, however, the bead gasket manages with only one pair or at most two pairs of holding elements and complementary holding elements.

By producing the two or more gasket layers in one piece in combination with folding and securing them in the holding engagement, the multi-layer bead gasket is obtained in a small number of production steps. Unlike the prior art, the gasket layers do not each have to be individually produced, stored in magazines, separated out again, positioned one above or on top of the other and held in position with respect to each other while being joined. Folding ensures and advantageously even improves the precision with which the gasket layers are positioned relative to each other. The number of holding elements and complementary holding elements in the holding engagement can be reduced as compared to a bead gasket made of separately manufactured gasket layers, since the gasket layers no longer have to be positioned relative to each other by multiple holding elements and complementary holding elements. Due to the combination with folding, the function of the one or few holding elements and complementary holding elements can be reduced to that of securing the gasket layers against diverging from each other.

The holding element and the complementary holding element can be moulded and arranged on the respective gasket layer such that the holding engagement is at least substantially based on a frictional fit or at least involves a frictional fit. The holding engagement can then for example be a plug engagement. In such embodiments, one of the holding element and complementary holding element can be provided in the form of a passage, for example a circular bore, in the gasket layer in question, while the other is formed as a cam-like or pin-shaped axial protrusion on the other gasket layer. In the holding engagement, the axial protrusion is located in the passage in a frictional fit, wherein the protrusion is advantageously sufficiently flat in the axial direction that it does not protrude beyond the passage on the other side in the holding engagement.

In more advantageous embodiments, however, the holding element and the complementary holding element are moulded and arranged on the respective gasket layer such that the holding engagement is at least substantially based on a positive fit. The holding element and the complementary holding element can in particular engage behind each other in the holding engagement in relation to the axial direction and press against each other in the axial direction with a tensioning force based on elastic deformation. The tensioning force can be based on elastic deformation of the one or more folding portions and/or on elastic deformation of the holding element and/or on elastic deformation of the complementary holding element. The holding element and the complementary holding element can in principle also be plastically deformed when establishing the holding engagement, but are preferably only or at least substantially elastically deformed and press against each other with an elastic tensioning force in the axial direction in order to tension the gasket layers axially with respect to each other with said elastic tensioning force.

The holding element and/or the complementary holding element can (each) for example be a latching element, and the holding engagement can accordingly be a latching engagement. In such embodiments, the holding element and the complementary holding element can be moulded such that they initially slide off on each other when establishing the holding engagement, wherein the holding element and/or the complementary holding element is/are elastically deformed, and the holding element and/or complementary holding element deformed in this way is released in the final part of the relative movement and snaps into the holding engagement. It is more advantageous if the holding element and/or the complementary holding element is/are elastically deformed by means of a tool when establishing the holding engagement and expediently held in their elastically deformed state by the same tool until the holding element has passed behind the complementary holding element as viewed from the first gasket layer. Once the holding element and the complementary holding element have reached this relative position, the respective element which up until then has been elastically deformed can be released, such that it presses against the other element with the tensioning force based on the elastic deformation. In such embodiments, the gasket layers are also held with no axial clearance in the region of the holding engagement when the tensioning force is generated only by elastic deformation of the holding element and/or complementary holding element.

The holding engagement can be non-releasable. More preferably, however, the holding engagement can be non-destructively released.

In the holding engagement, the holding element can engage behind an outer circumferential edge of the second gasket layer, or the complementary holding element can engage behind an outer circumferential edge of the first gasket layer, as viewed in an axial plane. The axial plane extends in the axial direction and thus at least substantially orthogonally with respect to the gasket layers. The outer circumferential edge is free in the sense that the respective gasket layer does not extend beyond the free circumferential edge as viewed in a plan view. A holding element or complementary holding element which extends up to and including the free outer circumferential edge of the gasket layer in question can be manufactured very easily, since a free outer circumferential edge results automatically when manufacturing the bead gasket, for example when punching the gasket layers from a sheet metal panel. The holding element or complementary holding element in question does not have to be formed especially, but rather inevitably occurs during production as a by-product.

The holding element and/or the complementary holding element can (each) protrude freely from a root end. The freely protruding holding element and/or the freely protruding complementary holding element can advantageously be elastically flexible and thus (each) form a spring tongue. Forming one of the two elements, for example the holding element, as a spring tongue and forming the other element, for example the complementary holding element, as a free outer circumferential edge and the edge portion inwardly immediately adjoining in the plan view is a particularly preferred combination.

When the holding element and/or the complementary holding element is/are embodied as a spring tongue, the element in question advantageously exhibits a cross-section which, as viewed from the free end, increases in size towards the root end and preferably widens in an axial plan view onto the gasket layer in question. It preferably increases in size continuously. The spring tongue advantageously has its largest cross-section, for example its widest cross-section in a plan view, at the root end. When embodied as a projecting spring tongue, the holding element and/or the complementary holding element can protrude by a transition radius in the plan view at the root end.

The holding element and/or the complementary holding element can (each) be a spring tongue, in particular a spring tongue such as has been described above. In simple embodiments, the spring tongue which is not subject to a load extends continuously from its root end up to its free end in the gasket layer which forms the spring tongue. If, as is preferred, the gasket layer is planar in the immediate vicinity of the spring tongue, the spring tongue is accordingly also planar. In a further development, the free end of the spring tongue which is not subject to a load extends out of the associated gasket layer in relation to the axial direction. The spring tongue can protrude out of its immediate vicinity abruptly via a sharply angled inflection or via a gently curved bend, such that in a lateral view, its free end protrudes beyond the immediate vicinity of the gasket layer which forms the spring tongue. As already mentioned, the immediate vicinity can in particular be planar. In the further development, the free end of the spring tongue extends out of the gasket layer forming the spring tongue, in a direction pointing away from the other gasket layer, when the gasket layers axially face each other and are not subject to a load, before the holding engagement is established. A spring tongue which is pre-moulded in this way has to be elastically deformed to a greater extent than in the simple embodiments in order to establish the holding engagement, which consequently increases the tensioning force with which the spring tongue acts in the axial direction in the holding engagement. In view of the typically small thicknesses of the gasket layers, this is advantageous in order to ensure a secure holding engagement.

The holding element and/or the complementary holding element can (each) be bent roundedly in the axial direction and bent back again or expediently crimped in order to keep the thickness of the bead gasket low in the region of the holding engagement. The bent or crimped element extends out of the plane of its associated gasket layer into the plane of the other gasket layer. When embodied as a crimped element, it can in particular be shaped as a step with a shoulder which slopes axially or obliquely with respect to the axial direction. The local overall thickness directly in the holding engagement can thus be at least substantially limited to the sum of the thicknesses of the gasket layers in the immediate vicinity of the holding engagement.

In advantageous first embodiments, the holding element and the complementary holding element act on each other only in the axial direction in the holding engagement. In second embodiments, they can comprise abutting points which face opposite each other transversely with respect to the axial direction in the holding engagement and restrict the mobility of the gasket layers transversely with respect to the axial direction by way of an abutting contact between the abutting points. However, since the gasket layers are positioned relative to each other transversely with respect to the axial direction via the one or more folding portions, it is possible to dispense with additionally fixing them transversely with respect to the axial direction in the holding engagement, not least since a transverse abutment also always harbours the risk of attrition and thus the ingress of soiling in the event of relative movements such as can occur between the gasket layers during operation.

The one or more folding portions define a folding axis of the bead gasket. In an axial plan view onto the unfolded bead gasket, the folding axis extends in the one or more folding portions transversely with respect to the axial direction. It can extend through the one or more folding portions. In most embodiments, however, it will extend at a certain axial offset to the folding portion(s) before being folded.

In advantageous embodiments, the one or more folding portions are (each) significantly narrower, as measured along the folding axis in the plan view, than the bead gasket. In advantageous embodiments, a maximum width of the bead gasket as measured parallel to the folding axis is at least three times or at least five times as large as the respective folding portion width. Where a maximum width of the bead gasket is mentioned here, this only refers to the width measured parallel to the folding axis.

The first gasket layer and the second gasket layer can be connected to each other via one folding portion only. In developments, however, the bead gasket comprises a first folding portion and a second folding portion which extend at a distance from each other in the axial plan view. In the plan view onto the bead gasket which has not yet been folded, i.e. in a flat projection of the bead gasket, a material-free cavity thus remains between the folding portions along the folding axis. In preferred embodiments, the first gasket layer and the second gasket layer are connected to each other by precisely two folding portions which are relatively narrow as measured in the plan view onto the folding axis.

The first gasket layer and the second gasket layer can protrude in the shape of wings pointing away from the one or more folding portions in the axial plan view onto the unfolded bead gasket.

For precisely positioning the gasket layers relative to each other, it is advantageous if the respective folding portion is pre-moulded along the folding axis in the unfolded state of the bead gasket, i.e. provided with a pre-moulded fold, for example locally bulged or embossed along the folding axis, in order to pre-define the folding axis and facilitate folding.

In order to avoid problems while transporting, storing, separating out and lastly automatically assembling the bead gasket, it is advantageous if the gasket layers lie close to each other over the outer circumferential edge once the holding engagement has been established, in order to prevent the bead gaskets from snagging. For this purpose, it is advantageous if the first gasket layer and/or the second gasket layer, preferably both gasket layers, is or are each curved concavely up to their outer circumferential edge with respect to the other of the gasket layers, respectively. This means that the respective gasket layer with no forces acting on it is concave up to its outer circumferential edge with respect to the other of the gasket layers in axial planes which are parallel to the folding axis and orthogonal with respect to the gasket layers, when the gasket layers are axially facing each other and before the holding engagement is established, such that end-facing surfaces of the gasket layers near the outer circumferential edge converge at an acute angle towards the outer circumferential edge in these axially extending planes and enter into surface contact or at least a defined linear contact near the outer circumferential edge only due to the action of an axial force which can in particular be generated in the holding engagement between the holding element and the complementary holding element. It is thus possible to counteract any divergence and associated formation of a gap on the outer circumference of the bead gasket. This concave pre-moulding means that the gasket layers are elastically deformed to a minor extent on the outer circumferential edge and in the region near the edge due to the force acting axially in the holding engagement, as viewed over their entire surface, and so lie against each other on the circumferential edge.

In order to obtain said concavity, the first gasket layer and/or the second gasket layer can be curved with a large radius of curvature and therefore with a flat, rounded bulge in relation to the other gasket layer in each case. In advantageous embodiments, the first gasket layer and/or the second gasket layer is/are inflected at a sharp angle and, when not subject to a load, slope(s) obliquely from the inflection to both sides in the shape of a roof. In an axial plan view onto the gasket layer which is pre-moulded in this way, the inflection can extend obliquely at an angle of advantageously 90°±30° or 90°±20°. The less the angle deviates from 90°, the more favourable the arrangement. The inflection preferably extends orthogonally with respect to the folding axis. Conversely, it is advantageous if the inflection extends only alongside the one or more gasket loops of the respective gasket layer and not through a gasket loop. In axial planes which are parallel to the folding axis and orthogonal with respect to the gasket layers, the gasket layers form a flat triangle or a flat rhombus before the holding engagement is established. In the plan view, the inflection can in particular extend through a central region of the inflected gasket layer. The respective gasket layer can in principle also be inflected multiple times. Advantageously, however, the respective gasket layer only exhibits one inflection.

In another development, which is advantageously combined with the aforementioned development but can also be implemented without it, the first gasket layer and/or the second gasket layer with no forces acting on it/them curve(s) in a folding plane, which is orthogonal with respect to the folding axis and extends through the holding engagement, convexly away from the folding axis towards the holding engagement and from the other of the gasket layers in each case. This convexity also refers to a state in which the gasket layers face each other axially, but the holding engagement has not yet been established. The convex curvature increases the tensioning force acting in the axial direction in the holding engagement and counteracts any axial clearance in the holding engagement. This is advantageous both for handling, as already explained in connection with the concavity, and for its use in preferred applications such as for example as an outlet gasket of a pump, in order to be better able to compensate for axial component tolerances and/or assembly tolerances and/or changes in pressure and/or temperature.

The bead gasket can in particular be a metal bead gasket, thus enabling a gasket to be provided which is inexpensive, reliable and long-lasting (due to a lack of gap extrusion) and fosters technical cleanliness (no attrition of elastomer particles) as compared to an elastomer gasket or elastomer composite gasket. The gasket layers are preferably sheet metal structures. The gasket layers are preferably produced from a sheet of spring steel. The gasket layers including the holding element and the complementary holding element can be formed contiguously, via the one or more folding portions, from a sheet of metal, in particular a sheet of spring steel, expediently by punching and deep-drawing. Thus, in a first step, passages for the fluid and cavities such as for example for manufacturing the holding element or as applicable the multiple holding elements can be produced by punching, one or more beads can be formed by means of deep drawing, and the respective gasket blank, i.e. the unfolded bead gasket, can then be individually punched out a larger sheet metal panel.

The bead gasket can in particular be an uncoated metal bead gasket. However, the possibility is not to be excluded that the bead gasket is a metal bead gasket and the first gasket layer and/or the second gasket layer is/are coated or covered in a flexible gasket material, for example an elastomer or thermoplastic elastomer (TPE), in order to improve the micro-sealing effect. An uncoated metal bead gasket is how preferred, since an elastomer coating increases the risk of attrition and/or detachment and thus contamination.

In advantageous embodiments, the first gasket layer comprises a first gasket loop, and the second gasket layer comprises a second gasket loop. In an axial plan view, the first gasket loop surrounds a first inner region through which fluid can flow and which comprises a gasket end-facing surface for an axial contact with one of the components delineating the gap which is to be sealed off. In the plan view, the second gasket loop surrounds a second inner region through which the fluid can flow and which comprises a gasket end-facing surface for an axial contact with the other of the components delineating the gap. As viewed in the plan view, the first inner region and the second inner region overlap each other at least partially and preferably completely. At least one of the gasket loops is a bead loop. Where a gasket loop is formed as a bead loop, said gasket end-facing surface is a bead end-facing surface, wherein the first gasket loop can be a first bead loop and/or the second gasket loop can be a second bead loop. Preferably, the first gasket loop is a first bead loop and the second gasket loop is a second bead loop. In principle, however, it would be conceivable for one of these two gasket loops to for example be a planar gasket loop which is for example coated in an elastomeric gasket material on the outer side facing away from the other gasket loop.

Due to the linear compression of the respective bead loop, a critical minimum surface compression can be better maintained than when using soft material gaskets, even when the gap width changes relatively significantly. The bead gasket in accordance with an aspect of the invention can compensate for variations in the gap width of advantageously more than 0.1 mm, in some applications 0.2 mm or even more.

The first gasket layer comprises a passage for the fluid in the first inner region. In an axial plan view, the first gasket loop surrounds the passage located in the first inner region. It is a smallest gasket loop surrounding the passage of the first inner region. This means that the passage in question is not surrounded by any gasket loop which is smaller. In the axial plan view, the first gasket loop also preferably does not surround any other sealing stay of the bead gasket, such as for example another gasket loop. The first gasket layer preferably comprises multiple passages alongside each other in the first inner region, and the first gasket loop surrounds these passages as the smallest gasket loop. The first gasket loop, if embodied as a first bead loop, is preferably a half-bead, but can alternatively also be a full-bead.

The second gasket layer likewise comprises a passage for the fluid in the second inner region. In an axial plan view, the second gasket loop surrounds the passage located in the second inner region and is a smallest gasket loop surrounding the passage of the second inner region. This means that the passage in question is not surrounded by any gasket loop which is smaller. In the axial plan view, the second gasket loop also preferably does not surround any other sealing stay of the bead gasket, such as for example another gasket loop. The second gasket layer preferably comprises multiple passages alongside each other in the second inner region, and the second gasket loop surrounds these passages as the smallest gasket loop. The second gasket loop, if embodied as a second bead loop, is preferably a half-bead, but can alternatively also be a full-bead. If the first gasket loop and the second gasket loop are each beaded loops, the first beaded loop and the second beaded loop are advantageously of the same type in this respect.

The axial direction is the main flow direction of the fluid through the respective passage of the first and second gasket layers.

In the plan view, the first gasket loop can completely encircle the first inner region over 360° and advantageously surround the one or more passages with no gaps and/or interruptions. In such embodiments, the first inner region is fluidically separated from the radially outer vicinity of the gasket loop in the sealing contact, i.e. when installed. In principle, however, the possibility is not to be excluded that the first gasket loop allows a flow in the radial direction from the first inner region outwards or into the first inner region from without by being locally interrupted at one point or as applicable also at multiple points over its circumference. The same applies analogously to the second gasket loop.

The first gasket layer can comprise a first rigidifying structure which in the plan view extends from the first gasket loop into the first inner region, preferably traverses the first inner region and thereby rigidifies the first gasket loop. Instead of or preferably in addition to the first gasket layer, the second gasket layer can comprise a second rigidifying structure, which in the plan view extends from the second gasket loop into the second inner region, preferably traverses the second inner region and thereby rigidifies the second gasket loop.

The respective rigidifying structure makes it more difficult to elastically deform the bead gasket in the respective inner region if the axial width of the gap to be sealed decreases as a result of tolerances due to changing operating conditions or from installation to installation. Rigidifying in the first inner region and/or in the second inner region improves the force-displacement characteristics of the bead gasket, such that the bead gasket in accordance with an aspect of the invention can compensate for larger variations in the axial width of the join which is to be sealed. The surface compression and/or linear compression in the sealing contact is increased as compared to a conventionally designed bead gasket with no rigidifying structure (reference gasket). The bead gasket in accordance with an aspect of the invention counteracts a reduction in the join width, within the expected range of variation in the join width, with a restoring spring force which is greater than that of the reference gasket. It can advantageously be installed with a higher axial biasing force than the reference gasket.

When the respective gasket loop is embodied as a half-bead in particular, the rigidifying structure can reduce a tendency by the gasket loop to fold or tilt, thus enabling a sealing contact to be more reliably ensured.

The first rigidifying structure, if provided, and the first gasket loop are advantageously connected to each other fixedly, particularly advantageously formed in one piece, and in particular cannot be separated from each other without being destroyed. The second rigidifying structure, if provided, and the second gasket loop are advantageously connected to each other fixedly, particularly advantageously formed in one piece, and in particular cannot be separated from each other without being destroyed.

The phrase "formed in one piece" is understood to mean formed in a way which does not require joining. The respective gasket loop and its rigidifying structure, if one is provided, are preferably formed from one blank, advantageously by moulding said blank.

In simple embodiments, the first gasket layer comprises the first gasket loop only and accordingly exhibits the first inner region only. In a further development, the first gasket layer comprises another, third gasket loop. The third gasket loop can in particular be a bead loop and for reasons of association is referred to in such embodiments as the third bead loop. In the axial plan view, the third gasket loop surrounds a third inner region located alongside the first inner region and comprises a gasket end-facing surface, preferably a bead end-facing surface, for an axial contact with one of the components. The first gasket layer can comprise the third gasket loop alongside the first gasket loop in an axial plan view, preferably at a distance and thus separate from the first gasket loop. A passage for fluid is likewise located in the third inner region. The third gasket loop can likewise be a smallest gasket loop which surrounds the passage of the third inner region. With regard to rigidifying the third gasket loop by means of an optional third rigidifying structure, the statements made with respect to rigidifying the first gasket loop apply similarly. The third gasket loop, if embodied as a bead loop, is preferably a half-bead, but can alternatively also be a full-bead.

The bead gasket can be conventionally embodied with respect to the third gasket loop or, as in preferred embodiments, can comprise a third rigidifying structure which extends from the third gasket loop into the third inner region in order to rigidify the third gasket loop.

The second gasket layer can comprise a fourth gasket loop, preferably a bead loop. In the axial view, the fourth gasket loop can surround a fourth inner region comprising one or more passages for the fluid and comprise a gasket end-facing surface, preferably a bead end-facing surface, for a sealing contact with one of the components or yet another gasket loop. The third gasket loop and the fourth gasket loop can be provided relative to each other in such a way that the third inner region and the fourth inner region overlap each other in the axial plan view. With regard to rigidifying the fourth gasket loop by means of an optional fourth rigidifying structure, the statements made with respect to rigidifying the first gasket loop apply similarly. The fourth gasket loop, if embodied as a bead loop, can be a full-bead or a half-bead. In advantageous embodiments, the third bead loop and the fourth bead loop are of the same type in this respect.

When the bead gasket is ready for assembly, the gasket layers lie axially one above the other. An intermediate layer or also as applicable multiple intermediate layers can be arranged between the first gasket layer and the second gasket layer. In preferred embodiments, however, the first gasket layer and the second gasket layer lie directly one on top of the other.

Each of the first gasket loop and any other gasket loop comprises a gasket end-facing surface, preferably a bead end-facing surface, for an axial contact with a stay of the respective component or an optional intermediate gasket layer of the bead gasket. Where it is said in connection with a rigidifying structure that the respective rigidifying structure extends from the respective gasket loop into its inner region in the axial plan view, this means that the rigidifying structure in question protrudes radially inwards beyond the stay of the respective component when the bead gasket is installed. The rigidifying structure thus hinders the flow of the fluid in the axial direction, i.e. it forms a flow resistance.

The respective rigidifying structure can protrude slightly into the inner region from the gasket loop which it is provided to rigidify. It can for example slightly elongate the gasket loop radially inwards, such that the respective gasket loop for example slightly protrudes circumferentially and annularly inwards beyond the component stay on which it is to be placed.

In preferred embodiments, the respective rigidifying structure traverses the inner region of the gasket loop which it is provided to rigidify. In advantageous embodiments, the rigidifying structure traverses the central region of the respective inner region. In the axial plan view, the respective rigidifying structure can for example be a connecting stay which traverses the respective inner region. In developments, the respective rigidifying structure can comprise multiple connecting stays. The multiple connecting stays can for example be arranged in the shape of a star in the plan view. In other embodiments, the respective rigidifying structure is latticed, retiform or cribriform.

The respective rigidifying structure can be disc-shaped, i.e. planar, or trough-shaped, i.e. curved.

It is in principle sufficient for one contiguous passage for the fluid to be provided in the inner region of the respective gasket loop. In preferred embodiments, however, multiple mutually separate passages are arranged in the respective inner region which together form a cross-section of the respective gasket loop or respective inner region through which fluid can flow. The respective rigidifying structure can then for example occupy more than 30% or more preferably a majority of the inner region surrounded by the respective bead loop and can be provided with said one or preferably more passages of the respective bead loop. The optional first rigidifying structure and/or the optional second rigidifying structure and/or the optional third rigidifying structure and/or the optional fourth rigidifying structure can in particular be multiply perforated, i.e. can comprise multiple passages for the fluid alongside each other in the plan view, which together form the cross-section through which fluid can flow, i.e. the flow cross-section, surrounded by the respective gasket loop. The cross-sectional area, measured in the axial view, of the inner region surrounded by the respective gasket loop is advantageously at least five times or at least ten times larger than the respective individual passage of the multiple passages. The passages can in particular be round, for example circular, passage holes.

In applications in which the bead gasket serves to seal off an outlet of a lubricating oil pump, the respective rigidifying structure can advantageously act as a throttle. The throttling effect of the respective rigidifying structure can be advantageous in a cold initial state of the pump in order to reduce pressure spikes caused by an increased viscosity of the fluid when cold. Such pressure spikes can for example damage a filter arranged downstream of the pump.

The pump can advantageously be embodied as a vane cell pump. The sub-vane regions of the vanes can be connected to the high-pressure side of the pump in order to be able to apply the fluid of the high-pressure side to the lower sides of the vanes. In vane cell pumps featuring a sub-vane pressure supply, the first rigidifying structure and/or the second rigidifying structure, if provided, can be used as a cold start facilitator. Additionally, or instead, the third rigidifying structure, if provided, and/or the fourth rigidifying structure, if provided, can be used as a cold start facilitator. In the cold initial state in particular, for example when cold-starting a pump, the throttling effect of the respective rigidifying structure makes it difficult for the delivered fluid, in particular oil, to flow off from the pump. The sub-vane regions are preferably connected to the high-pressure side of the pump upstream of the bead gasket. In such embodiments, the respective rigidifying structure generates an augmented throttling effect due to the increased viscosity of the fluid in the cold state and thus a particularly rapid supply of pressure to the sub-vane regions when cold-starting the pump, such that during the cold start, the fluid presses the vanes outwards against a stroke contour surrounding the rotor even at a low rotational speed of the delivery member. The respective rigidifying structure can be designed such that in the cold state, the delivered fluid is preferentially made available to the sub-vane pressure supply and the sub-vane regions are therefore preferentially supplied with the fluid in order to press the vanes outwards against the stroke contour.

In addition, or in other applications, the respective rigidifying structure can for example be used as a filter or screen. It is also conceivable for the respective rigidifying structure to be used to even out the fluid flow.

An aspect of the invention relates to a bead gasket not only per se but also in preferred applications in which it serves to seal off one or more pump outlets. An aspect of the invention also relates to a pump for applying a pressure fluid to a unit or for supplying a unit with a pressure fluid. This can for example be a gear pump for supplying a gearbox with hydraulic fluid, a lubricant pump and/or coolant pump for supplying a drive motor, such as for example an internal combustion engine or electric motor, with lubricant and/or coolant, for example lubricating oil.

The pump comprises a pump housing featuring a housing circumferential wall and a housing end-facing wall. The housing circumferential wall surrounds a delivery chamber of the pump. The housing end-facing wall exhibits an outer housing end-facing surface facing axially away from the delivery chamber. The housing end-facing wall can advantageously delineate the delivery chamber on one of its end-facing sides, but need not be a chamber wall, but can instead be set back from the delivery chamber. The pump housing comprises an inlet and an outlet for the fluid. The outlet emerges on the outer housing end-facing surface of the housing end-facing wall. The pump also comprises a delivery member which can be moved within the delivery chamber in order to deliver the fluid from a low-pressure side of the pump comprising the inlet to a high-pressure side of the pump, where it is delivered through the outlet.

In accordance with an aspect of the invention, the pump comprises a bead gasket comprising a first gasket layer and a second gasket layer which lie axially one above the other. The gasket layers preferably lie axially one against the other. The bead gasket serves as an outlet gasket. The first gasket layer comprises a first gasket loop, and the second gasket layer comprises a second gasket loop. In an axial plan view onto the pump, the first gasket loop surrounds a first inner region through which the fluid can flow. It comprises a gasket end-facing surface for an axial contact with a sealing stay. In an axial plan view, the second gasket loop surrounds a second inner region through which the fluid can flow and comprises a gasket end-facing surface for an axial contact with another sealing stay. The first inner region and the second inner region overlap each other in the plan view at least partially and preferably completely. At least one of the gasket loops is a bead loop, hence the first gasket loop is a first bead loop and/or the second gasket loop is a second bead loop. The respective gasket end-facing surface is a bead end-facing surface. One of the gasket loops axially faces the outer housing end-facing surface and surrounds the outlet in the plan view in order to seal off the outlet. When the pump is installed, this gasket loop is in an end-facing axial sealing contact with a sealing stay of the outer housing end-facing surface of the pump housing. The other gasket loop comprises a gasket end-facing surface facing axially away from the outer housing end-facing surface, for an axial sealing contact.

If the bead gasket comprises the first rigidifying structure and/or the second rigidifying structure, the respective rigidifying structure overlaps with the outlet in the plan view, i.e. protrudes into the free flow cross-section of the outlet.

If the bead gasket serves as an outlet gasket, then the pump is particularly suitable, not least because of the bead gasket in accordance with an aspect of the invention, for applications in which the pump housing protrudes at least partially into an accommodating well of an accommodating device, as is for example typical of gear pumps. In such applications, the pump protrudes into the accommodating well with the bead gasket axially first, such that the bead gasket seals off the pump outlet with respect to the base of the accommodating well. The axial gap is formed between the outer end-facing surface of the pump housing, on which the bead gasket is arranged, and the axially opposite base of the well.

The bead gasket can be arranged in an indirect line of force to a spring device. A spring device can for example be provided in order to axially press the housing end-facing wall against the housing circumferential wall with a spring force when the pump is installed, if these two housing walls are provided in a loosely stacked axial arrangement, such as is for example typical in cartridge pumps. The spring device advantageously absorbs a larger portion of the axial forces acting via the axial gap than the bead gasket. In the axial sealing contact, the bead gasket which is arranged in the indirect line of force need only absorb the axial forces necessary for a secure seal and can therefore be optimised for its actual function, namely its sealing effect. The bead gasket can alternatively be arranged in the direct line of force. In such embodiments, it can form the spring device in order to axially tension the pump in its fastening. The spring device, if provided, can be provided at the point of installation or can preferably be a pre-assembled component of the pump.

The pump can for example be a linear stroke pump or more preferably a rotary pump. As a rotary pump, it can be an external-axle pump, for example an externally toothed wheel pump. Alternatively, it can be an internal-axle pump, for example an internally toothed wheel pump or a reciprocating piston valve pump or preferably a vane cell pump. The delivery member can be a toothed wheel, which can be rotated about an axis of rotation within the delivery chamber, or can comprise a rotor, which can be rotated about an axis of rotation within the delivery chamber, as well as vanes or sliding valves in order to deliver the fluid from a low-pressure side of the pump to a high-pressure side of the pump and through an outlet of the pump. The delivery member can advantageously serve to form delivery cells which periodically increase and decrease in size as the rotor rotates, in order to deliver the fluid from the low-pressure side of the pump to the high-pressure side of the pump.

In advantageous embodiments, the bead gasket of the pump is a bead gasket such as is also disclosed per se herein. The gasket layers are then connected to each other via the one or more folding portions and secured against diverging from each other by means of the at least one and preferably exactly one holding engagement. The first gasket layer and the second gasket layer can however also in principle be produced separately, and the first gasket layer can comprise multiple holding elements in a distribution around the first gasket loop and the second gasket layer can comprise multiple complementary holding elements in a distribution around the second gasket loop, in order to position the gasket layers one above the other in multiple holding engagements and to hold them in position with respect to each other. There is no folding step in such embodiments. A multi-layer bead gasket is also advantageous for use as an outlet gasket of a pump purely because of its greater spring displacement, irrespective of whether two or more gasket layers are produced in one piece and folded one over the other or whether two or more gasket layers are secured to each other by means of one or more holding engagements of the type disclosed herein or positioned with respect to each other.

With respect to the bead gasket both per se and as an outlet gasket of a pump, features such as for example the optionally implemented concave and/or convex pre-moulding while not subject to a load, i.e. a curvature in the form of a rounded bulge or by means of an inflection in the form of a flat roof, of at least one of the gasket layers relative to the other in each case are already advantageous in and of themselves. In such an embodiment, gasket layers which are arranged one above the other, preferably one on top of the other, can also be tensioned against each other in the circumferential region around the first gasket layer and second gasket layer and thus moved uniformly over this circumference into a sealing surface contact and held in said surface contact. This also for example applies to modifications in which the first gasket layer and the second gasket layer are produced separately and held together by means of multiple holding elements and complementary holding elements of the type described above which are arranged in a distribution around the gasket loops. Conversely, producing the first and second gasket layers together with the one or more folding portions and folding them into a multi-layer bead gasket is advantageous even without the holding engagement of the type described above, for example in combination with a different joining connection instead of the holding engagement, such as for example a folded connection or a rivet connection.

Another feature which is advantageous purely in its own right is that of rigidifying one or more bead loops of a single-layer or multi-layer bead gasket in the inner region by means of the rigidifying structure(s).

The features described herein in combination with folding or foldability or the holding engagement can advantageously be implemented in any bead gasket for sealing off a gap between a first component and a second component which comprises a first gasket layer featuring a holding element and a second gasket layer featuring a complementary holding element, wherein the gasket layers are joined to each other by means of a joining connection. The joining connection can in particular be a holding engagement of the type disclosed herein, based on a positive fit and/or frictional fit, but can in principle also be a different type of joining connection, for example a rivet connection or a folded connection between the holding element and the complementary holding element. A multi-layer bead gasket of this type can implement any of the features disclosed herein even without the feature of folding/foldability and/or without the feature of the holding engagement based on a positive fit and/or frictional fit.

BRIEF DESCRIPTION OF THE DRAWINGS

Example embodiments of the invention are explained below on the basis of figures. Features disclosed by the example embodiments, each individually and in any combination of features, advantageously develop the claims and the embodiments which are also described above. There is shown:

FIG. 5 the bead gasket of the first example embodiment in an unfolded state;

FIG. 6 the bead gasket of the first example embodiment in a folded and secured state;

FIG. 7 the bead gasket of the first example embodiment in a longitudinal section;

FIG. 8 the bead gasket of the first example embodiment in a schematic representation;

FIG. 9 a folding portion of the bead gasket in a longitudinal section;

FIG. 10 the folding portion in the unfolded state;

FIG. 11 a holding device of the bead gasket of the first example embodiment before a holding engagement is established;

FIG. 12 the holding device while the holding engagement is being established;

FIG. 13 the holding device in the holding engagement;

FIG. 14 a first modification of the holding device;

FIG. 15 a second modification of the holding device;

DETAILED DESCRIPTION OF THE INVENTION

Figure 1:
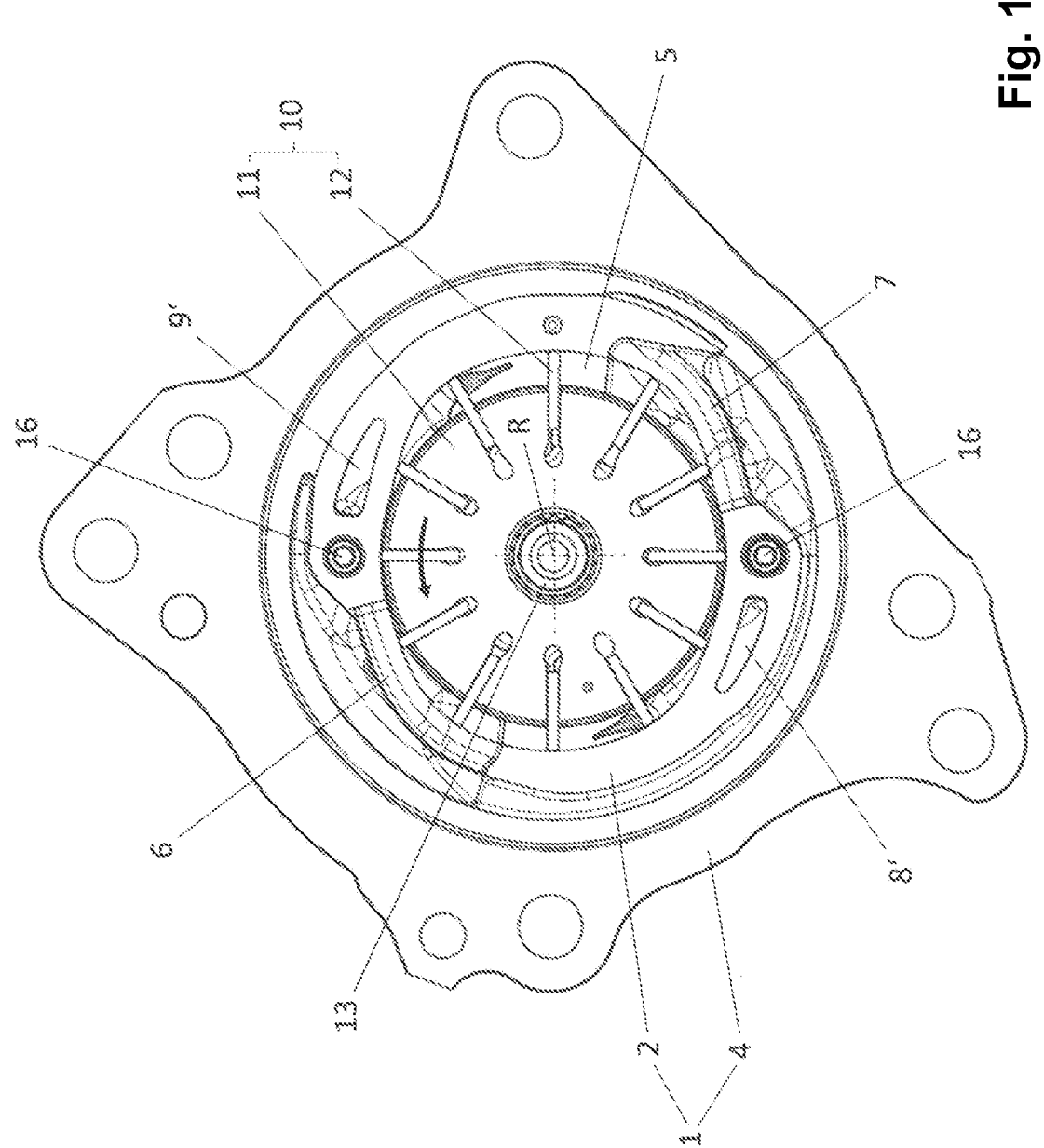
FIG. 1 a pump in an axial plan view onto a delivery chamber of the pump.

FIG. 1 shows a pump in an axial view onto a pump housing 1. A delivery chamber 5 is formed in the pump housing 1. The pump housing 1 comprises a housing circumferential wall 2, which surrounds the delivery chamber 5, and housing end-facing walls which axially delineate the delivery chamber 5 on both end-facing sides, of which one housing end-facing wall 4 can be seen. The other of the end-facing walls has been removed in FIG. 1 in order to reveal the interior of the delivery chamber 5.

The pump is embodied as a rotary pump and comprises a rotor 11, which can be rotated about an axis of rotation R in the delivery chamber 5, and multiple vanes 12 which are guided in slots of the rotor 11 such that they can be moved radially or at least substantially in the radial direction, as is typical in vane cell pumps. The rotor 11 and the vanes 12 together form a delivery member 10—in the example embodiment, an impeller—of the pump. An inner circumference of the housing circumferential wall 2 comprises a guide surface for the vanes 12. When the delivery member 10 is rotated, the vanes 12 are pressed outwards against the guide surface of the housing circumferential wall 2. As the rotor 10 rotates, the guide surface determines how far the vanes 12 protrude beyond the outer circumference of the rotor 11. The vanes 12 delineate delivery cells, formed in the delivery chamber 5, in the circumferential direction. The profile of the guide surface of the housing circumferential wall 2 is chosen such that when the delivery member 10 rotates, the delivery cells periodically increase in size on a low-pressure side of the delivery chamber 5 and decrease again in size on a high-pressure side of the delivery chamber 5 in order to expel a fluid, which flows into the delivery chamber 5 through an inlet on the low-pressure side of the delivery chamber 5, at an increased pressure through an outlet on the high-pressure side of the delivery chamber 5 as a pressure fluid. In advantageous embodiments, the pump is configured to suction the fluid through the inlet, for example against gravity.

In order to be rotary-driven, the rotor 11 is non-rotationally connected to a drive shaft 13. The drive shaft 13 passes through the housing end-facing wall 4 and the rotor 11 and protrudes into a blind hole in the housing end-facing wall which is not shown in FIG. 1. A drive portion of the drive shaft 13 protrudes outwards beyond the housing end-facing wall 4 and can be rotary-driven. A drive wheel, for example a belt disc for a belt drive, a chain wheel for a chain drive or a toothed wheel for a toothed wheel drive, can be non-rotationally connected to the drive shaft 13 in the drive portion.

The housing circumferential wall 2 forms a closed ring, while the end-facing walls 3 and 4 are each plate-shaped. In a first angular range over which the low-pressure side of the first working flux extends, the housing circumferential wall 2 comprises a cavity on each of the two end-facing sides in order to form the first inlet 6. In another angular range, over which the low-pressure side of the second working flux extends, the housing circumferential wall 2 also comprises a second cavity on each of the two end-facing sides in order to form the second inlet 7 (FIG. 1). The fluid can flow into the delivery chamber 5 (FIG. 1) via the cavities in the housing circumferential wall 2 on the end-facing sides, i.e. via the first inlet 6 and the second inlet 7. The housing circumferential wall 2 also comprises a cavity on its outer circumference in each of the angular range of the inlet 6 and the angular range of the inlet 7. The cavities on the circumference each extend axially from the cavity on one end-facing side to the axially opposite cavity on the other end-facing side. The cavities on the circumference connect the cavities of the first inlet 6 on the two end-facing sides and, on the opposite side, the cavities of the second inlet 7 on the two end-facing sides, such that a large-volume first inlet 6 and an equally large-volume second inlet 7 are obtained. The housing end-facing walls 3 and 4 can each be provided with associated cavities in order to increase the flow cross-section of the inlet 6 and the flow cross-section of the inlet 7.

The housing end-facing wall 4 comprises a flange which serves for assembling the pump. In the assembled state, the pump housing 1 is fixed to an accommodating device in the region of the flange.

A radial gasket 43 is arranged on the outer circumference of the pump housing 1. In the example embodiment, it is accommodated in a groove which encircles the outer circumference of the housing end-facing wall 4. The radial gasket 43 serves to separate, at the point of installation, a low-pressure space which surrounds the pump housing 1 on the outer circumference in the assembled state from the external environment of the pump.

The pump is a multi-flux pump—in the example embodiment, a dual-flux pump—i.e. it comprises a first working flux and a second working flux. The delivery chamber 5 accordingly comprises a first inlet 6 and a first outlet for the first working flux and a second inlet 7 and a second outlet for the second working flux. When the pump is in operation, the delivery member 10 rotates anti-clockwise in FIG. 1, as indicated by a rotational direction arrow. The pressure outlets are arranged in the housing end-facing wall which is not shown in FIG. 1. A first connecting channel which extends axially through the housing circumferential wall 2 on the high-pressure side of the first working flux is denoted by 8', and a second connecting channel which extends axially through the circumferential housing wall 2 on the high-pressure side of the second working flux is denoted by 9'. The connecting channels 8' and 9' connect pressure spaces formed in the region of the housing end-facing wall 4 to the pressure outlets of the axially opposite housing end-facing wall of the pump housing 1 which is not shown in FIG. 1.

Figure 2:
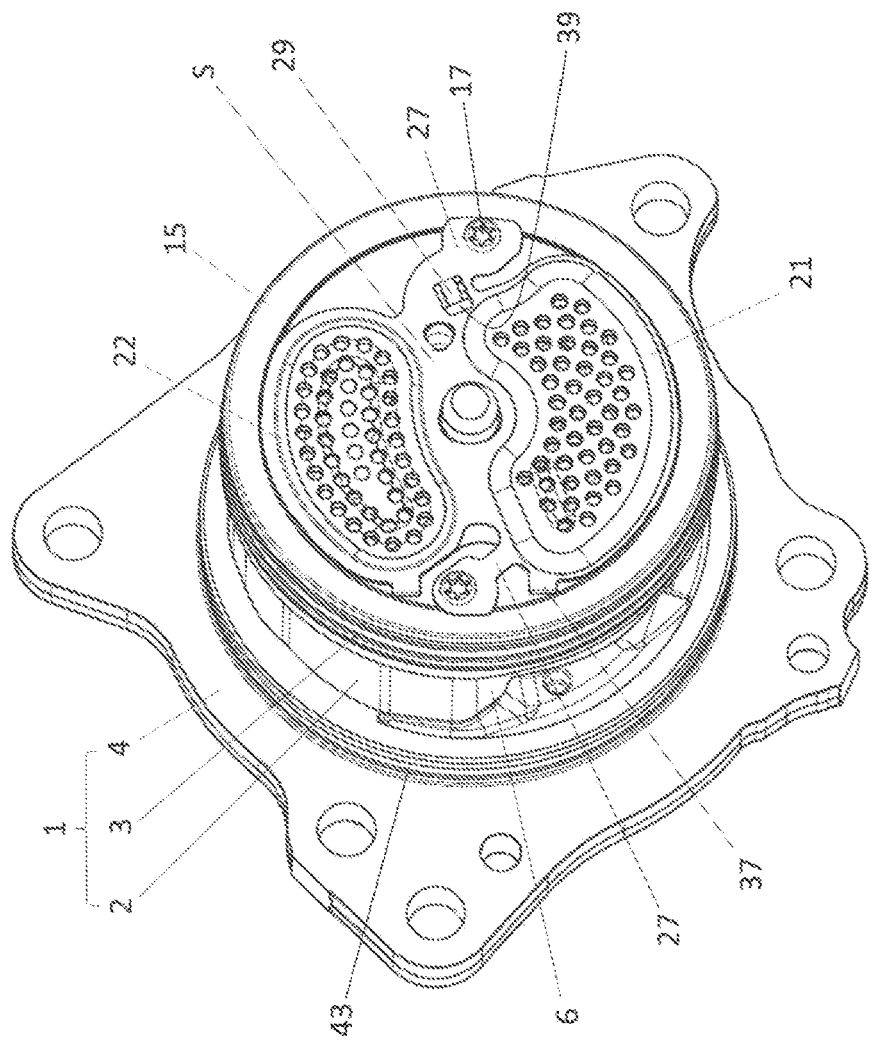
FIG. 2 the pump in an isometric view onto an end-facing side on which a bead gasket of a first example embodiment is arranged.

FIG. 2 shows the pump in a pre-assembled state in an isometric view onto an end-facing outlet side of the pump. The outlet side is formed on an outer end-facing side of the first housing end-facing wall 3 which is not shown in FIG. 1 but can be seen in FIG. 2. A bead gasket S and a disc spring 15 are arranged on the outer end-facing side of the housing end-facing wall 3. The first outlet and the second outlet emerge on the outer end-facing side of the housing end-facing wall 3. The bead gasket S covers these pressure outlets. The connecting channels 8' and 9' which can be seen in FIG. 1 are assigned to the pressure outlets, wherein the connecting channel 8' emerges into the first outlet which passes through the housing end-facing wall 3, and the connecting channel 9' emerges into the second outlet which likewise passes through the housing end-facing wall 3.

The bead gasket S comprises multiple bead loops which extend around inner regions of the bead gasket S. The fluid can flow through the inner regions, which are delineated on the radially outer side by the bead loops. A bead loop 21 and a bead loop 22 can be seen in FIG. 2. The bead loop 21 surrounds an inner region of the bead gasket S which lies axially opposite the first outlet and overlaps with it in an axial view. The bead loop 22 surrounds another inner region of the bead gasket S which is axially opposite the second outlet and overlaps with it in an axial view.

The bead gasket S is a multi-layer gasket—in the example embodiment, a dual-layer gasket. Its two gasket layers are connected to each other via one or more folding portions 37. One of the gasket layers comprises a holding element 29, and the other gasket layer comprises a complementary holding element 39, which are in a holding engagement with each other and, in the holding engagement, counteract the gasket layers diverging from each other.

The wall structures of the pump housing 1, i.e. the housing circumferential wall 2, the first housing end-facing wall 3 and the second housing end-facing wall 4, together delineate the delivery chamber 5 (FIG. 1) over its circumference and axially at its end-facing sides. The housing end-facing walls 3 and 4 each abut the housing circumferential wall 2 in an axial contact. The housing circumferential wall 2 can advantageously be joined loosely, i.e. not in a material fit, to the end-facing walls 3 and 4.

The housing circumferential wall 2 and the housing end-facing walls 3 and 4 are held together in an axial layered assemblage within the pre-assembled pump unit by means of a positioning and holding device. The positioning and holding device comprises a first positioning element 16 and a second positioning element 16 which can be seen in FIG. 1. One positioning element 16, which is then preferably a central positioning element, would in principle also suffice. The respective positioning element 16 protrudes from the second housing end-facing wall 4 in the axial direction in the shape of a rod, protrudes through the housing circumferential wall 2 in the axial direction and also protrudes through the first housing end-facing wall 3. During pre-assembly, the housing circumferential wall 2 and the first housing end-facing wall 3 are slid along the positioning elements 16 towards the housing end-facing wall 4.

The bead gasket S is held on the pump housing 1 by means of the positioning and holding device. The bead gasket S comprises a central passage which, during pre-assembly, is slid onto an axial projection on the outer end-facing side of the housing end-facing wall 3, thus centring the bead gasket S when it is assembled. The bead gasket S is held on the pump housing 1 by means of a screw connection and/or clip connection and/or comparable type of joining connection. For this purpose, the positioning and holding device comprises one or more joining elements 17, such as for example one or more screws and/or one or more clip elements. The bead gasket S comprises tab-shaped fastening structures 28 which protrude on the outer circumference of the bead gasket S and are penetrated by passages for the joining elements 17. The joining element or elements 17 is or are in joining engagement with the positioning element or elements 16 and thus hold the housing walls 2, 3 and 4 and the bead gasket S together as a pre-assembled pump unit.

In the pre-assembled state, the disc spring 15 is likewise held on the outer end-facing side of the housing end-facing wall 3. It can in particular be held by means of the bead gasket S. The bead gasket S can engage axially behind the disc spring 15, such that the inner circumference of the disc spring 15 extends at least in regions and preferably only in regions, i.e. locally, in an axial gap remaining between the housing end-facing wall 3 and the bead gasket S and is thus held loosely between the housing end-facing wall 3 and the bead gasket S. The pump housing 1 which is held together as a layered assemblage by means of the holding device 16, 17, together with the disc spring 15 and the bead gasket S, forms the pre-assembled pump unit in the form of an assembly unit which is easy to assemble as a whole.

The disc spring 15 is designed to exert an axial spring force on the pump housing 1 when the pump is installed, in order to press the housing end-facing walls 3 and 4 axially against the housing circumferential wall 2 and thus keep the delivery chamber 5 sealed. The disc spring 15 can additionally serve to separate the outlets from the low-pressure side of the pump. It can form an axial gasket in addition to the bead gasket S.

Figure 3:
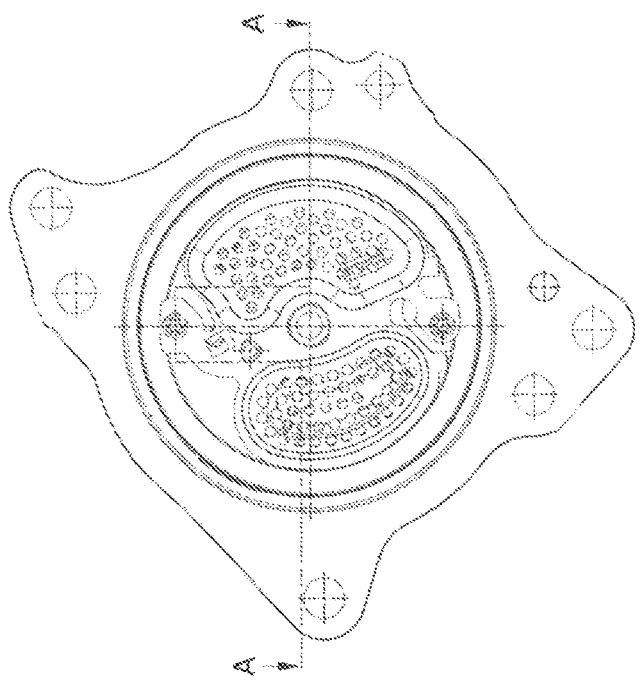
FIG. 3 the pump in an axial plan view onto the end-facing side comprising the bead gasket.

FIG. 3 is a plan view onto the pump end-facing side on which the bead gasket S is arranged. The course of a longitudinal section A-A is indicated. The longitudinal section A-A extends in a straight line from the left towards the central region in FIG. 3, wherein its extension crosses the axis of rotation R at a slight distance. In the central region, the longitudinal section A-A jumps to the level of one of the positioning elements 16 or joining elements 17, intersects them, then jumps back into the central region, but now exactly at the level of the axis of rotation R, and extends from the rebound in a straight line to the right further through the pump.

Figure 4:
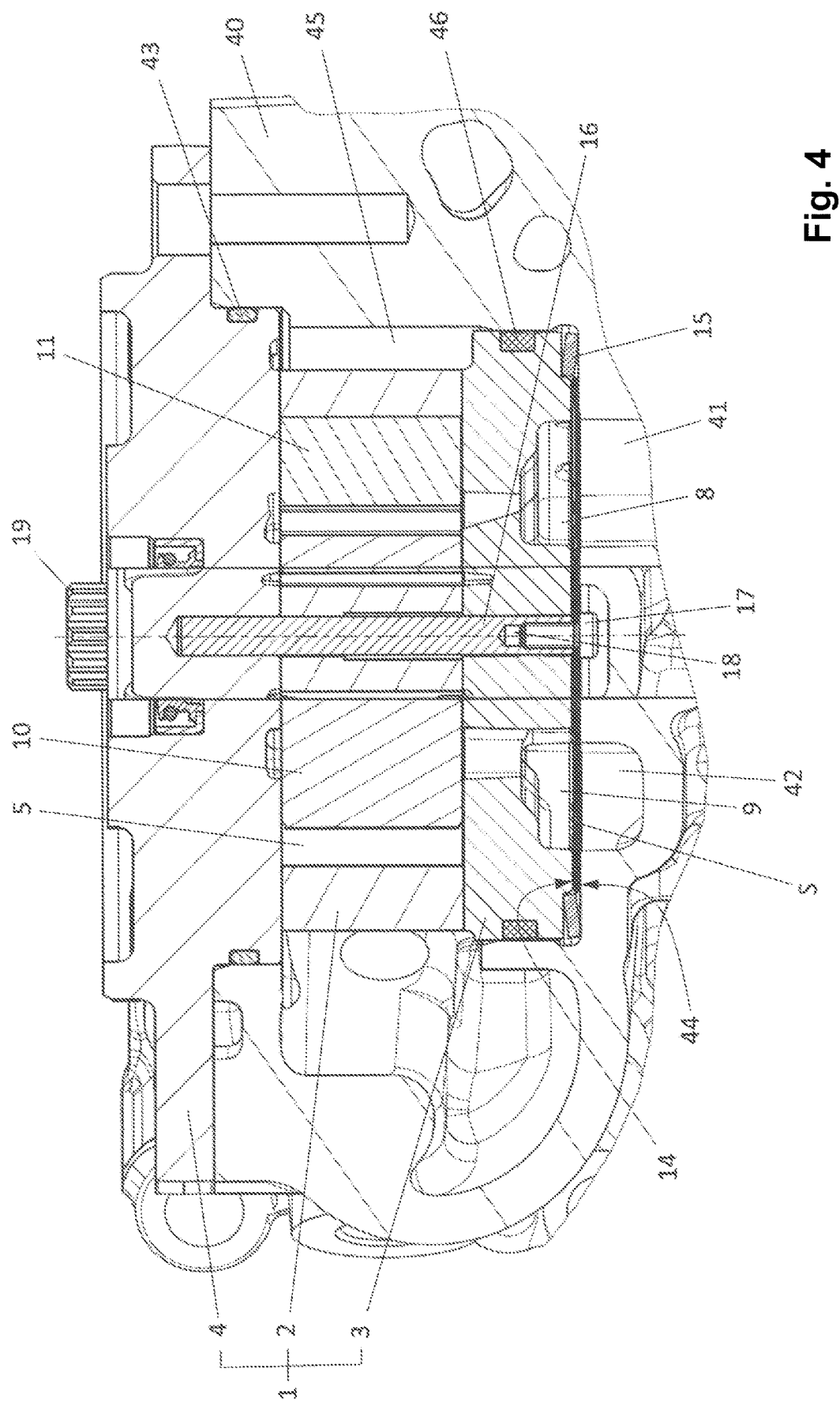
FIG. 4 the pump arranged in an accommodating device.

FIG. 4 shows the pump in the longitudinal section A-A of FIG. 3, but in the assembled state. The pump is arranged on an accommodating device 40. The pump is arranged such that it protrudes, with the disc spring 15 and the bead gasket S first, into an accommodating well of the accommodating device 40. The assembly flange of the housing end-facing wall 4 of the pump abuts the accommodating device 40, and the pump is fastened to the accommodating device 40 in the region of the flange, for example by means of a screw connection.

The pump protrudes, with its port side first, into the accommodating device 40. An outer housing end-facing surface 14 of the housing end-facing wall 3 lies opposite an accommodating end-facing surface 44 on the base of the accommodating well of the accommodating device 40 at a slight axial distance, i.e. across an axial gap.

A low-pressure space 45 which is formed on the outer circumference of the pump housing 1 is delineated on the radially outer side by an inner circumference of the accommodating device 40, at one end-facing end by the radial gasket 43 and at the other axial end by another radial gasket 46. When the pump is in operation, the fluid enters the delivery chamber 5 via the low-pressure space 45 and the inlets 6 and 7 (FIGS. 1 and 2) which emerge in the low-pressure space 45. The low-pressure side of the pump comprises the low-pressure space 45, the inlets 6 and 7 and the low-pressure side of the delivery chamber 5.

A first pressure port 41 and a second pressure port 42, via which the fluid can be discharged in the axial direction, emerge on the accommodating end-facing surface 44 on the high-pressure side of the pump. As already explained on the basis of FIG. 1, the fluid is discharged in the region of the first working flux via a first outlet 8 which passes through the housing end-facing wall 3 and in the region of the second working flux via a second outlet 9 which likewise passes through the housing end-facing wall 3. The connecting channels 8' and 9' which can be seen in FIG. 1 emerge into the associated pressure outlets, i.e. the connecting channel 8' emerges into the first outlet 8 and the connecting channel 9' emerges into the second outlet 9. The pressure outlets 8 and 9 extend through the housing end-facing wall 3 and emerge on the latter's outer housing end-facing surface 14 in a recess of the housing end-facing wall 3 in each case. These recesses can be seen in FIG. 3 and are also referred to here as the first outlet 8 and second outlet 9. The first outlet 8 of the pump lies axially opposite the first pressure port 41. The second outlet 9 of the pump lies opposite the second pressure port 42. When the pump is in operation, the fluid of the first working flux is discharged via the first outlet 8 and the first pressure port 41. The fluid of the second working flux is discharged via the second outlet 9 and the second pressure port 42.

The bead gasket S is arranged in the axial gap remaining between the housing end-facing surface 14 and the accommodating end-facing surface 44 and separates the first outlet 8 and first pressure port 41 from the second outlet 9 and second pressure port 42.

One of the positioning elements 16 and the fastening of the bead gasket S by means of the positioning element 16 can also be seen. The arrangement is the same for the other positioning element 16. The end-facing end of the positioning element 16 facing the bead gasket S comprises an axial recess 18, such as for example a blind hole. The joining element 17 protrudes from without in relation to the housing end-facing wall 3 in the region of one of the fastening structures 28 (FIG. 2) through the bead gasket S and into the recess 18, where it is in a joining engagement with the positioning element 16. The joining element 17 and joining connection are for example implemented as a fastening screw and screw connection, respectively.

When the pump is assembled, the disc spring 15 is supported axially on the accommodating end-facing surface 44 and acts with its spring force axially on the outer housing end-facing surface 14. In this way, the disc spring 15 presses the housing end-facing wall 3 against the housing circumferential wall 2 and presses the housing circumferential wall 2 against the housing end-facing wall 4 with a spring force, thus obtaining an axially sealed and fixed assemblage of the end-facing walls 3 and 4 and the housing circumferential wall 2 and ensuring that the delivery chamber 5 is sealed.

As is preferred, but merely by way of example, the disc spring 15 is in contact with the housing end-facing surface 14 in the region of an inner circumference and with the accommodating end-facing surface 44 in the region of an outer circumference. The bead gasket S can thus engage behind the disc spring 15 on its inner circumference which axially faces the accommodating end-facing surface 44 and hold it on the pump housing 1 in the pre-assembled state (FIG. 2).

The disc spring 15 surrounds the outlet 8 and also the outlet 9 in one continuously and completely circumferential and self-contained arc. It can be developed into an additional axial gasket and separate the first outlet 8 and the second outlet 9 from the low-pressure side of the pump—in particular, in the example embodiment, the low-pressure space 45. It can replace the radial gasket 46 and, in such a development, the gasket which is nearest to the low-pressure side as viewed from the high-pressure side. It can however also be developed into an axial gasket and provided in addition to the radial gasket 46 and support the latter in sealing off the high-pressure side from the low-pressure side. It is, however, a prerequisite that when the pump is assembled, the disc spring 15 is supported towards both axial sides via the gap on end-facing walls which extend continuously all the way round with no interruptions.

FIGS. 5, 6 and 7 each show the bead gasket S per se and not assembled. FIG. 5 shows a flat projection of the bead gasket S in an axial plan view. FIGS. 6 and 7 show the bead gasket S when folded and secured against diverging. FIG. 6 is a plan view onto the end-facing side of the bead gasket S which axially faces the housing end-facing wall 3. FIG. 7 is the longitudinal section C-C indicated in FIG. 6.

The bead gasket S is formed in one piece. It comprises a first gasket layer 20, a second gasket layer 30 and folding portions 37. In the flat projection of FIG. 5, the gasket layers 20 and 30 lie alongside each other and are connected to each other by exactly two folding portions 37. The bead gasket S is not folded. In the plan view, a folding axis F extends through the folding portions 37. When the folding portions 37 are folded, the gasket layers 20 and 30 are pivoted towards each other about the folding axis F until they are folded and axially opposite each other.

The folding portions 37 together form a folding region of the bead gasket S. Prior to folding, the gasket layers 20 and 30 protrude away from each other out of the folding region in the shape of wings. The gasket layers 20 and 30 are significantly broader, as measured parallel to the folding axis F, than the folding region formed by the folding portions 37. The unfolded bead gasket S is provided with a cavity 27 in the folding region between the gasket layers 20 and 30. The folding portions 37 are spaced apart from each other along the folding axis F across the cavity 27. The cavity 27 thus reduces the breadth of the folding portions 37. In the example embodiment, the folding portions 37 are each moulded as narrow strips, as measured along the folding axis F.

In the unfolded state, one of the fastening structures 28 protrudes freely into the cavity 27 between the folding portions 37. The fastening structure 28 in question can be formed directly by producing the cavity 27, for example by punching. The other of the fastening structures 28 protrudes freely outwards from an opposite circumferential section of the gasket layer 20 which faces away from the folding portions 37. The fastening structures 28 each comprise a passage for one of the joining elements 17 each (FIGS. 2 and 4).

The bead gasket S comprises a holding element 29 and a complementary holding element 39 which can be moved into a holding engagement with each other. The holding element 29 and the complementary holding element 39 lie opposite each other across the folding axis F in the flat projection of FIG. 5, i.e. prior to folding, such that when folded, they are pivoted towards each other. In the holding engagement, they counteract the gasket layers 20 and 30 diverging from each other. The holding element 29 is part of the first gasket layer 20. The complementary holding element 39 is part of the second gasket layer 30. The holding element 29 protrudes freely from a root end and is flexurally elastic. It is formed as a spring tongue. The complementary holding element 39 is formed by an edge portion on the outer circumferential edge of the second gasket layer 30. The holding element 39 includes a portion of the free outer circumferential edge of the gasket layer 30 and extends from the free outer circumferential edge slightly into the region of the gasket layer 30 close to the edge.

Instead of the total of two folding portions 37 as in the example embodiment, the folding region can also in principle comprise more folding portions, each one advantageously a narrow folding portion, comparable to the folding portions 37. In another modification, the gasket layers 20 and 30 can also be connected to each other by one folding portion only. Dividing them into two folding portions 37 is however advantageous for precisely defining the folding axis F and consequently the relative position of the gasket layers 20 and 30 when folded. Another advantage is that a fastening structure 28 can be produced by forming the recess 27 between the folding portions 37, which saves material as compared to a fastening structure which is located outside the folding region.

In the plan view, the holding element 29 is arranged in the region of the fastening structure 28 which is at a distance from the folding portions 37. In the example embodiment, it is formed in the root region of the fastening structure 28.

In order to facilitate folding and in particular to precisely define the folding axis F, the folding portions 37 are each provided with a pre-moulded fold 38. The pre-moulded fold 38 can for example be an embossing or bulge which extends along the folding axis F.

The first gasket layer 20 comprises a first bead loop 21 which can already be seen in FIG. 2 and which surrounds a first inner region in an axial plan view. The bead loop 21 is a smallest bead loop with respect to the first inner region and encloses, i.e. completely surrounds, the first inner region in the plan view. The bead loop 21 is a half-bead.

The first bead loop 21 is rigidified in the first inner region as compared to conventional bead loops. It is rigidified by means of a first rigidifying structure 23 which extends circumferentially from the inner edge of the bead loop 21 into the inner region. The rigidifying structure 23 can be shaped as a planar thin disc or, as in the example embodiment, as an axially shallowly curved thin trough structure. It comprises multiple passages 25 which are arranged alongside each other and through which the fluid can flow when the pump is in operation. The rigidifying structure 23 extends along the entire inner circumference of the bead loop 21 and rigidifies the bead loop 21 radially inwards uniformly over the entire inner circumference.

The second gasket layer 30 comprises a second bead loop 31 which surrounds a second inner region in the plan view. The bead loop 31 forms a smallest bead loop with respect to the second inner region and encloses, i.e. completely surrounds, the second inner region in the axial view. The bead loop 31 is rigidified radially inwards, i.e. in the second inner region, in a similar way to the bead loop 21. A second rigidifying structure 33, which can be shaped as a planar thin disc or, as in the example embodiment, as an axially shallowly curved thin trough structure, serves to rigidify the second bead loop 31. The second rigidifying structure 33 comprises passages 35 for the fluid, in a similar way to the first rigidifying structure 23.

The first gasket layer 20 comprises another, third bead loop 22 which can already be seen in FIG. 2 and which surrounds a third inner region in the axial plan view. The bead loop 22 forms a smallest bead loop with respect to the third inner region and encloses, i.e. completely surrounds, the third inner region in the axial view. The bead loop 22 is also rigidified in its inner region. A third rigidifying structure 24, which can be shaped as a planar thin disc or, as in the example embodiment, as an axially shallowly curved thin trough structure, serves to rigidify the third bead loop 22. The rigidifying structure 24 extends uniformly over the entire inner circumference of the third bead loop 22 in order to rigidify it radially inwards over the inner circumference. The third rigidifying structure 24 is also provided with multiple passages 25 for the fluid delivered by the pump, which are arranged alongside each other, in a similar way to the first rigidifying structure 23.

The first bead loop 21 and the third bead loop 22 are arranged alongside each other in the plan view, such that the associated inner regions are also arranged alongside each other and at a distance from each other. In the example embodiment, the bead loops 21 and 22 also extend separately at a distance from each other. The central passage of the gasket layer 20, which in the folded state serves to centre the bead gasket S on the pump housing 1, is for example situated between the bead loops 21 and 22.

Lastly, the second gasket layer 30 comprises a fourth bead loop 32 which surrounds a fourth inner region in the plan view. The bead loop 32 forms a smallest bead loop with respect to the fourth inner region and encloses, i.e. completely surrounds, the fourth inner region in the plan view. The bead loop 32 is also rigidified in its inner region. A fourth rigidifying structure 34, which can be shaped as a planar thin disc or, as in the example embodiment, as an axially shallowly curved thin trough structure, serves to rigidify the fourth bead loop 32. The rigidifying structure 34 extends uniformly over the entire inner circumference of the fourth bead loop 32 in order to uniformly rigidify it radially inwards over the inner circumference. The fourth rigidifying structure 34 is also provided with multiple passages 25 for the fluid delivered by the pump, which are arranged alongside each other, in a similar way to the first rigidifying structure 23.

The second bead loop 31 and the fourth bead loop 32 are arranged alongside each other in the plan view, such that the associated inner regions are also arranged alongside each other and at a distance from each other. In the example embodiment, the bead loops 31 and 32 also extend separately at a distance from each other. The central passage of the gasket layer 30, which once folded serves to centre the bead gasket S on the pump housing 1, is for example situated between the bead loops 31 and 32.

In the folded state, the first bead loop 21 and the second bead loop 31 overlap over their entire profile in the axial plan view, such that the inner regions surrounded by the bead loops 21 and 31 overlap each other at least substantially completely. The second bead loop 31 is moulded as a half-bead in a corresponding way to the first bead loop 21. The bead loops 21 and 31 splay away from each other in the axial direction, starting from their outer circumference and towards the common first inner region, thus increasing the axial spring displacement of the bead gasket S in the region of the bead loops 21 and 31 as compared to the respective individual bead 21 and 31. Increasing the axial spring displacement is advantageous with regard to compensating for variations in the axial width of the gap to be sealed off, as is desired.

In the folded state, the third bead loop 22 and the fourth bead loop 32 overlap over their entire profile in the axial plan view, such that the inner regions surrounded by the bead loops 22 and 32 overlap each other at least substantially completely. The bead loops 22 and 32 are likewise moulded as half-beads. The bead loops 22 and 32 splay away from each other in the axial direction, starting from their outer circumference and towards the common second inner region, thus increasing the axial spring displacement of the bead gasket S in the region of the bead loops 22 and 32 as compared to the respective individual bead 22 and 32. Increasing the axial spring displacement is advantageous with regard to compensating for variations in the axial width of the gap to be sealed off, as is desired.

In the unfolded state, the bead loops 21 and 31 on the one hand and/or the bead loops 22 and 32 on the other hand can in particular be mirror-symmetrical with respect to the folding axis F, such that they are axially flush over their entire profile when the bead gasket S is folded and secured in the holding engagement.

In an additional function, the rigidifying structures 23, 24, 33 and 34 are also resistance structures. In the example embodiment, they are each perforated with a large number of small passages 25 and 35, for example passage holes. The rigidifying structures 23, 24, 33 and 34 each form a flow resistance for the fluid to be delivered. The flow resistance ensures that the vanes 12 of the delivery member 10 (FIG. 1) are pressed radially outwards when the pump starts up, in particular when it is cold and the fluid is correspondingly viscous. In order to achieve this effect, the fluid delivered by the pump is applied to the lower sides of the vanes 12, in the so-called sub-vane region. The rigidifying structures 23, 24, 33 and 34 serve to ensure that the sub-vane region is supplied with pressure fluid.

The bead gasket S is a sheet metal structure. It can in particular be a sheet steel structure and preferably a spring steel structure. The bead gasket S can however in principle also be a plastic structure, for example an organic sheet structure. Sheet steel and in particular spring sheet steel are however preferred. The gasket layer 20 and/or the gasket layer 30 can (each) be coated in an elastomeric gasket material, although it can be advantageous to omit a coating and embody the bead gasket as a purely metal bead gasket.

The bead gasket S is advantageously installed at the point of installation with an axial biasing force. The biasing force is expediently chosen such that it ensures a spring force which is sufficient for strength of seal under all installation conditions, i.e. with regard to unavoidable component tolerances and installation tolerances and also with regard to variations in the axial width of the gap associated with changes in temperature and/or pressure.

In advantageous embodiments, the bead gasket S is designed with regard to the co-operating pairs of bead loops 21 and 31 as well as 22 and 32 such that it can compensate for variations in the axial gap width of at least 0.1 mm or at least 0.2 mm, preferably 0.3 mm or more, and ensures a sufficient seal across the respective range of variation in the axial gap width.

The bead gasket S is arranged in an indirect line of force to the disc spring 15 (FIG. 4). The disc spring 15 absorbs the majority of the axial force acting across the gap when the gap width is reduced. The disc spring 15 is accordingly designed such that it can compensate for variations in the axial gap width of at least 0.1 mm or at least 0.2 mm, preferably 0.3 mm or more, and elastically absorbs the majority of the axial force acting across the join, across the respective range of variation in the axial gap width, and optionally creates a seal with respect to the low-pressure space 45.

FIG. 6 shows the bead gasket S when folded and ready for assembling on the pump housing 1 (FIG. 2). The gasket layers 20 and 30 are folded about the folding axis F and lie one over the other—in the example embodiment, and as is preferred, one on top of the other. The holding element 29 and the complementary holding element 39 are in holding engagement with each other. FIG. 6 shows the folded bead gasket S in an axial plan view onto the gasket layer 30 which in the pre-assembled pump unit, as shown in FIG. 2, faces the housing end-facing wall 3. In the holding engagement, the holding element 29 engages behind the complementary holding element 39 in relation to the axial direction. The free outer circumferential edge of the gasket layer 30 which forms part of the complementary holding element 39 is therefore covered by the holding element 29 in the plan view of FIG. 6.

The holding engagement lies opposite the folding region across a central region of the folded bead gasket S. A sectional plane which is orthogonal with respect to the folding axis F extends between the folding portions 37 and through the holding engagement. If one imagines two straight lines which intersect in the plan view onto the folded bead gasket and sub-divide the bead gasket S into four sectors, such that each folding portion 37 extends completely in a first sector and each holding engagement is formed in a second sector in the plan view, wherein the first sector and the second sector are mirror images of each other across the point of intersection of the straight lines, then it is in principle advantageous if these two sectors each extend over a sector angle of at most 90° or at most 60°.

In order to obtain a uniform contact over the outer circumferential edge of the mutually abutting gasket layers 20 and 30, the gasket layers 20 and 30 are each pre-moulded such that they are concave with respect to each other up to their respective outer circumferential edge in the folded state, even before the holding engagement has been established. In the example embodiment, this concavity is achieved by providing each of the gasket layers 20 and 30 with an inflection which extends in the central region. In the plan view of FIG. 6, the inflection 36 in the gasket layer 30 can be seen as a straight inflection line which crosses the gasket layer 30. The inflection 36 and the inflection of the other gasket layer 20 each extend approximately orthogonally with respect to the folding axis F. The gradient is chosen such that the respective inflection extends on the one hand through the central region of the bead gasket S from circumferential edge to circumferential edge, but only outside the bead loops—in FIG. 6, outside the bead loops 31 and 32. In sectional planes extending in the axial direction from the plane of the plan view, parallel to the folding axis F, the gasket layers 20 and 30 form a very flat rhombus when folded but not yet secured, wherein the gasket layers 20 and 30 are not yet touching or at least not axially tensioned against each other on the outer circumferential edge.

FIG. 7 shows the bead gasket S in the longitudinal section C-C of FIG. 6. The axial spring displacement of the bead gasket S, which due to its multi-layer structure is longer than that of single-layer embodiments, can in particular be seen in FIG. 7. It can also be seen that the rigidifying structures 24 and 34 are convex relative to each other, such that the axial distance be them is reduced in a central region within the bead loops 22 and 32. In the example embodiment, the rigidifying structures 24 and 34 abut each other axially in the central region.

FIG. 8 shows the bead gasket S in a purely schematic axial sectional plane which is parallel to the folding axis F. The bead gasket S is folded. The gasket layers 20 and 30 face axially opposite each other, the holding engagement has not yet been established and there are no external forces acting on the gasket layers 20 and 30. When not subject to any load in this way, the two gasket layers 20 and 30 are pre-moulded concavely relative to each other. The gasket layers 20 and 30 are pre-moulded in that they each comprise a small inflection 26 and 36 in the central region and taper towards each other at an acute angle from the central region, progressing outwards from the respective inflection 26 and 36 up to the outer circumferential edge. If the shaped bead loops are disregarded, as in the schematic representation in FIG. 8, then the gasket layers 20 and 30 together form a flat rhombus which is however overdrawn in FIG. 8. The overall roof-like shape of the bead gasket S in the unfolded state (FIG. 5) is barely recognisable. The respective inflection 26 and 36 can however be seen as a fine inflection line in the respective plan view. The inflection lines 26 and 36 are not however indicated in FIG. 5. In the flat projection of the bead gasket, they can form one straight line which extends through the central region and always between the bead loops. When the gasket layers 20 and 30 are unfolded, the inflections 26 and 36 can however also exhibit a certain offset with respect to each other or point at an obtuse angle to each other in the plan view, if it should for example only be possible for the inflections 26 and 36 to extend outside the bead loops.

Because they are concavely pre-moulded, the gasket layers 20 and 30 are drawn towards each other in the region of the inflections 26 and 36 when the holding engagement is established, such that they initially come into axial contact on the outer circumferential edge. Concavely pre-moulding them thus counteracts diverging at the outer circumferential edge.

FIGS. 9 and 10 show one of the folding portions 37 in an enlarged detail. FIG. 9 shows the folding region 37 in question when it is folded in the longitudinal section B-B of FIG. 6. FIG. 10 likewise shows the folding portion 37 in a longitudinal section, but before it has been folded. As already mentioned, the folding portions 37 are each provided with a pre-moulded fold 38 in order to more precisely define the folding axis F. The pre-moulded fold 38 is a local bulge which can be formed by deep drawing along with the bead loops 21, 22, 31 and 32 in the process of moulding the bead loops or which can also be moulded in a preceding or subsequent step.

FIGS. 11, 12 and 13 illustrate the holding element 29 and the complementary holding element 39 establishing the holding engagement, in the form of a sequence which proceeds from FIG. 11 to FIG. 13 via FIG. 12.

FIG. 11 shows an initial state in relation to establishing the holding engagement. The gasket layers 20 and 30 are already folded. The holding element 29 which is formed as a spring tongue is not subject to any load and extends in a planar manner in the immediate vicinity of the gasket layer 20. The gasket layer 30 is held at a distance from the holding element 29 in the axial direction in the region of the complementary holding element 39 or inherently diverges from the gasket layer 20 at the circumferential edge in the region of the complementary holding element 39.

FIG. 12 shows the next step in the sequence, in which using for example a pin-shaped tool of an automatic assembly machine, the holding element 29 is bent out of its gasket layer 20, towards the complementary holding element 39 and past its free end, the outer circumferential edge of the gasket layer 30, such that it clears the path for the complementary holding element 39 and the gasket layer 30 can be pressed towards the gasket layer 20 in the region of the complementary holding element 39 with the aid of another tool. If the holding element 29 is then released, it snaps back elastically and presses the complementary holding element 39 axially against the gasket layer 20 with a tensioning force based on elasticity.

FIG. 13 shows the gasket layers 20 and 30 in the immediate vicinity of the holding element 29 and the complementary holding element 39. The free end of the complementary holding element 39, the free outer circumferential edge of the gasket layer 30, lies below the free end of the holding element 29 as viewed from the gasket layer 20. In this rear engagement, the holding element 29 holds the gasket layer 30 on the gasket layer 20 via the complementary holding element 39. This counteracts the gasket layers 20 and 30 diverging from each other. In the holding engagement, the holding element 29 presses onto the complementary holding element 39 in accordance with its elastic deformation.

FIG. 14 shows the gasket layers 20 and 30 in the immediate vicinity of the holding engagement. The gasket layer 30 is modified with respect to its complementary holding element. The modified complementary holding element is denoted by 39'. The modified complementary holding element 39' is crimped such that its free end extends in the plane of the first gasket layer 20 when it is in the holding engagement. For this purpose, the second gasket layer 30 deflects sharply towards the gasket layer 20 in the region of an edge portion of the gasket layer 20 opposite the holding element 29 and deflects sharply back again when axially level with the gasket layer 20, such that the complementary holding element 39' is obtained in the form of a step-like profile. If, as in the example embodiment, the holding element 29 is planar when not subject to any load, its free end can protrude slightly beyond the second gasket layer 30 in the holding engagement. In order to reduce such protruding, it is also possible in another further development for the holding element 29 to be crimped or rounded, such that it lies flush on the complementary holding element 39' in the region of its free end in the holding engagement.

FIG. 15 shows the gasket layers 20 and 30 in the immediate vicinity of the holding engagement, wherein the gasket layer 20 comprises a holding element 29' which is modified as compared to the example embodiment in FIGS. 11 to 13. When not subject to any load, the holding element 29' protrudes out of the plane of its gasket layer 20, i.e. out of the immediate vicinity of the gasket layer 20, away from the other gasket layer 30. In order to establish the holding engagement, the holding element 29' is bent towards the complementary holding element 39 and through under it using a tool, as described with respect to the example embodiment in FIGS. 11 to 13. However, the degree of deformation necessary for bending is greater for the modified holding element 29' than for the holding element 29. As a result, it acts with a greater axial tensioning force on the complementary holding element 39 in the holding engagement.

Figure 16:
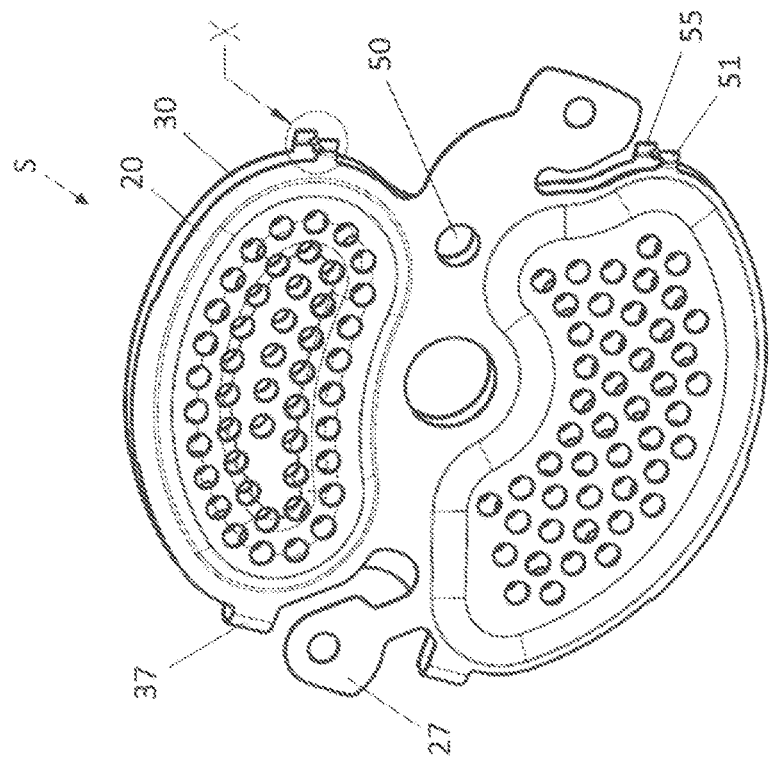
FIG. 16 a bead gasket of a second example embodiment.

FIG. 16 shows a bead gasket S of a second example embodiment in an isometric view onto the gasket layer 20. The bead gasket S is folded but not yet secured. The folding process per se is complete, and the gasket layers 20 and 30 lie axially opposite each other, but still diverge slightly from each other in the region of the outer circumferential edge opposite the folding region. The bead gasket S of the second example embodiment differs from the first example embodiment in the number and also embodiment of the holding elements and complementary holding elements.

Unlike the first example embodiment, the first gasket layer 20 comprises exactly two holding elements 51, and the second gasket layer 30 correspondingly comprises two complementary holding elements 55. The holding elements 51 and complementary holding elements 55 can be moved in respective pairs into a holding engagement. The holding elements 51 and the complementary holding elements 55 protrude freely outwards from the outer circumferential edge of the respective gasket layer 20 and 30.

Figure 19:
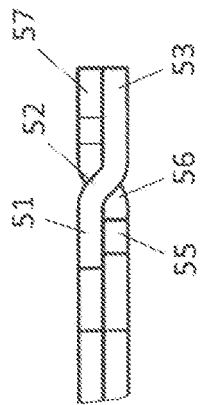
FIG. 19 the holding device of the second example embodiment in the holding engagement, in a longitudinal section.
Figure 20:
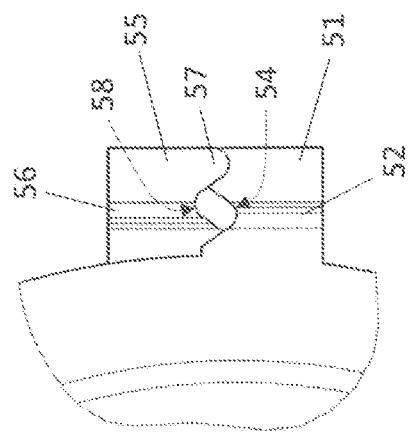
FIG. 20 the holding device of the second example embodiment in the holding engagement, in a plan view.
Figure 17:
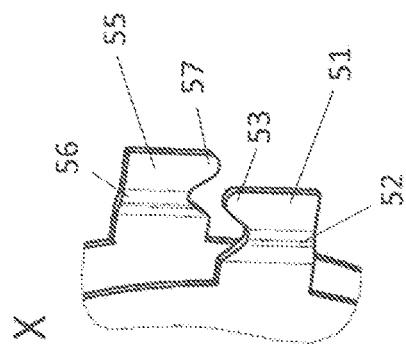
FIG. 17 a holding device of the bead gasket of the second example embodiment before a holding engagement is established.
Figure 18:
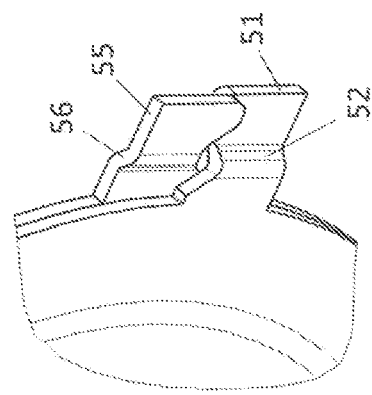
FIG. 18 the holding device of the second example embodiment in the holding engagement.

FIG. 17 shows a pair of the holding elements 51 and complementary holding elements 55 in the detail X from FIG. 16 and thus before the holding engagement has been established. FIGS. 18, 19 and 20 show the same pair of the holding element 51 and the complementary holding element 55 in the holding engagement, wherein FIG. 18 is a perspective view, FIG. 19 is an axially extending section, and FIG. 20 is an axial plan view.

The holding elements 51 and complementary holding elements 55 are crimped with respect to the axial direction. The respective holding element 51 comprises a crimp 52, and the respective complementary holding element 55 comprises a crimp 56. Via its crimp 52, the respective holding element 51 drops in the axial direction from the outer circumferential edge of the gasket layer 20 to be level with the outer circumferential edge of the gasket layer 30. In the other axial direction, the respective complementary holding element 55 drops via its crimp 56 from the outer circumferential edge of the gasket layer 30 to be level with the gasket layer 20. The shape of the crimps 52 and 56 can best be seen in the section in FIG. 19. By means of the crimps 52 and 56, the holding elements 51 and complementary holding elements 55 only widen the mutually abutting gasket layers 20 and 30 outwards in the holding engagement and do not increase the overall thickness in the vicinity of the holding engagement.

The holding elements 51 each comprise a projection 53 which protrudes towards the associated complementary holding element 55 with which the holding engagement is to be formed. The complementary holding elements 51 each comprise a projection 57 which protrudes towards the associated holding element 51 with which the holding engagement is to be formed. The holding elements 51 and the complementary holding elements 55 each comprise an indentation on their sides facing each other in the circumferential direction, in order to receive the projections 53 and 57. As can be seen in an overview of FIGS. 17 to 20 and in particular in FIG. 20, the pairs of co-operating holding elements 51 and complementary holding elements 55 respectively lie axially one over the other via the projection 53 and the projection 57 and press against each other with an elastic tensioning force, so as to tension the gasket layers 20 and 30 with respect to each other. It would in principle be sufficient for the holding engagement for each pair of the holding elements 51 and complementary holding elements 55 to comprise only one projection 53 or 57, as long as it overlaps in the holding engagement with the other engagement partner in each case, in order to act axially on the same.

The holding elements 51 and complementary holding elements 55 also comprise abutting points 54 and 58 (FIG. 20). The abutting points 54 and 58 lie between the outer circumferential edge of the respective gasket layer 20 and 30 on the one hand and the respective projection 53 and 57 on the other. The abutting points 54 and 58 lie in the region of the indentations.

In order to establish the holding engagement, the gasket layers 20 and 30 which are folded one onto the other are offset relative to each other in the circumferential direction by being elastically tensioned slightly, such that the holding elements 51 and complementary holding elements 55 are free from each other in the plan view. In this state, the gasket layers 20 and 30 are then pressed against each other on the outer circumferential edge at the holding elements 51 and complementary holding elements 55 and then released, while lying against each other, in relation to the circumferential direction. The gasket layers 20 and 30 spring back in the circumferential direction, such that the projections 53 and 57 of the holding elements 51 and complementary holding elements 55 overlap in pairs and thus enter into holding engagement. Once the overlap has been established, the gasket layers 20 and 30 can be axially released again. In order to facilitate tensioning and thus offsetting in the circumferential direction, the gasket layers 20 and 30 can each be provided with a passage 50, wherein the passages are axially flush in the folded state. For tensioning and offsetting, a rod-shaped tool can be inserted into the flush passages 50 and tilted with respect to the axial direction.

Aside from the differences described, the bead gasket S of the second embodiment corresponds to the bead gasket S of the first embodiment.

REFERENCE SIGNS 1 pump housing
2 housing circumferential wall
3 housing end-facing wall
4 housing end-facing wall
5 delivery chamber
6 inlet
7 inlet
8 outlet
8' connecting channel
9 outlet
9' connecting channel
10 delivery member
11 rotor
12 vane
13 drive shaft
14 outer housing end-facing surface
15 disc spring
16 positioning element
17 joining element
18 recess
19 drive wheel
20 gasket layer
21 bead loop
22 bead loop
23 rigidifying structure
24 rigidifying structure
25 passage
26 inflection
27 cavity
28 fastening structure
29 holding element
29' modified holding element
30 gasket layer
31 bead loop
32 bead loop
33 rigidifying structure
34 rigidifying structure
35 passage
36 inflection
37 folding portion
38 pre-moulded fold
39 complementary holding element
39' modified complementary holding element
40 accommodating device 41 pressure port
42 pressure port
43 radial gasket
44 accommodating end-facing surface
45 low-pressure space
46 radial gasket
47 —
48 —
49 —
50 passage
51 holding element
52 crimp
53 projection
54 abutting point
55 complementary holding element
56 crimp
57 projection
58 abutting point
F folding axis
R axis of rotation
S bead gasket

The invention claimed is:

1. A pump for applying fluid to a unit, the pump comprising:
   (a) a pump housing featuring
       a housing circumferential wall which surrounds a delivery chamber of the pump,
       a housing end-facing wall exhibiting an outer housing end-facing surface facing axially away from the delivery chamber,
       an inlet for the fluid and
       an outlet for the fluid which emerges on the outer housing end-facing surface;
   (b) a delivery member which can be moved within the delivery chamber in order to deliver the fluid from a low-pressure side of the pump comprising the inlet to a high-pressure side of the pump comprising the outlet; and
   (c) a bead gasket comprising a first gasket layer and a second gasket layer which lie axially one above the other,
   (d) wherein: the first gasket layer comprises a first gasket loop, and the second gasket layer comprises a second gasket loop; the first gasket loop surrounds a first inner region through which fluid can flow in an axial plan view, and the second gasket loop surrounds a second inner region through which the fluid can flow in the plan view; and the first inner region and the second inner region overlap each other at least partially in the plan view;
   (e) wherein the first gasket loop is a first bead loop comprising a gasket end-facing surface for an axial contact and the second gasket loop is a second bead loop comprising a gasket end-facing surface for an axial contact,
   (f) wherein one of the first gasket loop and the second gasket loop axially faces the outer housing end-facing surface and surrounds the outlet in the plan view in order to seal off the outlet,
   (g) wherein the bead gasket comprises one or more folding portions which connect(s) the first gasket layer and the second gasket layer, and wherein the first gasket layer, the second gasket layer and the respective one or more folding portions are formed in one piece, and the first gasket layer and the second gasket layer are folded one onto the other by folding over the respective one or more folding portions, such that they face each other in the axial direction, and
   (h) wherein the first gasket layer and the second gasket layer are formed contiguously, via the one or more folding portions, from a sheet of metal.

2. The pump according to claim 1, wherein the first bead loop and the second bead loop axially splay away from each other towards the respectively surrounded inner region, such that an increased axial spring displacement is obtained between bead end-facing surfaces which face axially away from each other.

3. The pump according to claim 1, wherein:
   the pump is arranged on an accommodating device;
   the accommodating device comprises an accommodating well featuring a base of the well;
   at least one axial portion of the pump housing is arranged in the accommodating well, such that the outer housing end-facing surface lies axially opposite the base of the well, forming an axial gap; and
   the bead gasket seals off the outlet in the axial gap.

4. The pump according to claim 1, wherein when the pump is assembled, the bead gasket exerts an axial spring force on the pump housing via the first gasket loop and the second gasket loop either in an indirect line of force to a spring device or in a direct line of force.

5. The pump according to claim 1, wherein the first gasket layer comprises a holding element and the second gasket layer comprises a complementary holding element, and wherein the holding element and the complementary holding element are in a holding engagement with each other based on a positive fit and/or frictional fit, in order to secure the first gasket layer and the second gasket layer against diverging from each other.

6. The pump according to claim 5, wherein the holding element and the complementary holding element engage behind each other in the holding engagement in relation to the axial direction.

7. The pump according to claim 5, wherein the holding element engages behind an outer circumferential edge of the second gasket layer, or the complementary holding element engages behind an outer circumferential edge of the first gasket layer, in the holding engagement and with respect to the axial direction.

8. The pump according to claim 5, wherein the holding element and/or the complementary holding element protrude(s) freely from a root end in the plan view and can be elastically bent out of the holding engagement.

9. The pump according to claim 5, wherein the respective one or more folding portions extend(s) completely in a first sector in an axial plan view onto the folded bead gasket, and the holding engagement is formed in a second sector in the plan view, wherein these sectors are delineated by two straight lines which intersect in the plan view and which are mirror images of each other across the point of intersection of the straight lines extend over a sector angle of at most 90°.

10. The pump according to claim 5, wherein the first and second gasket layers axially face each other when the folding portion(s) has/have been folded over and before the holding engagement has been established, and at least one of the first and second gasket layers is pre-moulded concavely in axial planes which are parallel to the folding axis and orthogonal with respect to the first and second gasket layers, up to its outer circumferential edge with respect to the other of the first and second gasket layers when it is free of external forces, such that end-facing surfaces of the first and second gasket layers taper towards each other at an acute angle towards the outer circumferential edge of the respective first and second gasket layer in these axial planes.

11. The pump according to claim 5, wherein the first gasket layer and the second gasket layer axially face each other when the one or more folding portion(s) has/have been folded over and before the holding engagement has been established, and at least one of the first gasket layer and the second gasket layer is/are curved in a folding plane, which is orthogonal with respect to the folding axis and extends through a central region of the bead gasket and/or through the holding element in an axial plan view onto the folded bead gasket, convexly away from the other of the first gasket layer and the second gasket layer as viewed from the folding axis, when it is free of external forces.

12. The pump according to claim 1, wherein: in an axial plan view onto the unfolded bead gasket, a folding axis of the bead gasket extends in the one or more folding portions transversely with respect to the axial direction; in the plan view along the folding axis, the respective folding portion exhibits a folding portion breadth and the bead gasket exhibits a maximum gasket breadth as measured parallel to the folding axis; and said maximum gasket breadth is at least three times as large as the respective folding portion breadth.

13. The bead gasket according to claim 1, wherein the one or more folding portions comprises a first folding portion and a second folding portion which connect the first gasket layer and the second gasket layer, and wherein the first gasket layer, the second gasket layer and the first folding portion and the second folding portion are formed in one piece, and the first gasket layer and the second gasket layer are folded one onto the other by folding over the first folding portion and second folding portion, such that they face each other in the axial direction, wherein in an axial plan view onto the unfolded bead gasket, a folding axis of the bead gasket extends in the first folding portion and the second folding portion and in a cavity located between the first folding portion and the second folding portion which is free of material in at least regions along the folding axis.

14. The pump according to claim 1, wherein the first gasket layer comprises a first rigidifying structure which in the plan view extends from the first gasket loop of the first gasket layer into the first inner region, in order to rigidify the gasket loop of the first gasket layer, and/or wherein the second gasket layer comprises a second rigidifying structure which in the plan view extends from the second gasket loop of the second gasket layer into the second inner region, in order to rigidify the second gasket loop of the second gasket layer.

15. The pump according to claim 14, wherein at least one of the first rigidifying structure and the second rigidifying structure is/are convex with respect to the other of the first rigidifying structure and the second rigidifying structure axially facing it.

16. The pump according to claim 14, wherein the first rigidifying structure of the first gasket layer traverses the first inner region of the gasket loop of the first gasket layer in the plan view, in order to rigidify the first gasket loop of the first gasket layer, and/or wherein the second rigidifying structure of the second gasket layer traverses the second inner region of the second gasket loop of the second gasket layer in the plan view, in order to rigidify the second gasket loop of the second gasket layer.

17. The pump according to claim 14, wherein the first rigidifying structure axially abuts the second rigidifying structure.

18. The pump according to claim 1, wherein the respective one or more folding portions is/are provided with a pre-moulded fold in order to pre-define the folding axis and facilitate folding.

19. The pump according to claim 1, wherein the respective first gasket loop or the second gasket loop embodied as a half-bead.

20. The pump according to claim 1, comprising a spring device to axially press the housing end-facing wall against the housing circumferential wall with a spring force when the pump is installed, the housing end-facing wall and the housing circumferential wall being provided in a loosely stacked axial arrangement, wherein the bead gasket is arranged in an indirect line of force to the spring device.

21. The pump according to claim 1, wherein
the pump is a multi-flux pump comprising the inlet and the outlet for a first working flux and a further inlet and a further outlet for a second working flux,
the first gasket layer comprises a third gasket loop alongside the first gasket loop in an axial plan view and formed as a third bead loop,
the second gasket layer comprises a fourth gasket loop alongside the second gasket loop in an axial plan view and formed as a fourth bead loop,
in the axial plan view, the third gasket loop surrounds a third inner region located alongside the first inner region and comprises a respective bead end-facing surface for an axial contact,
in the axial plan view, the fourth bead loop surrounds a fourth inner region located alongside the second inner region and comprises a respective bead end-facing surface for an axial contact,
the third inner region and the fourth inner region overlap each other at least partially in the plan view, and
one of the third bead loop and the fourth bead loop axially faces the outer housing end-facing surface and surrounds the further outlet in the plan view in order to seal off the further outlet.

22. The pump according to claim 1, wherein the pump is a gear pump for supplying a gearbox with hydraulic fluid, or a lubricant pump and/or coolant pump for supplying a drive motor of a motor vehicle with lubricant and/or coolant.

23. The pump according to claim 1, wherein: in an axial plan view onto the unfolded bead gasket, a folding axis of the bead gasket extends in the one or more folding portions transversely with respect to the axial direction; in the plan view along the folding axis, the respective folding portion exhibits a folding portion breadth and the bead gasket exhibits a maximum gasket breadth as measured parallel to the folding axis; and said maximum gasket breadth is at least five times as large as the respective folding portion breadth.

* * * * *